US011122533B2

(12) United States Patent
Surisetty et al.

(10) Patent No.: US 11,122,533 B2
(45) Date of Patent: Sep. 14, 2021

(54) METHOD AND USER EQUIPMENT FOR HANDLING DUAL REGISTRATION IN WIRELESS COMMUNICATION SYSTEM

(71) Applicant: SAMSUNG ELECTRONICS CO., LTD., Suwon-si (KR)

(72) Inventors: Vijay Ganesh Surisetty, Karnataka (IN); Prasad Basavaraj Dandra, Karnataka (IN); Seshadri Elluru, Karnataka (IN); Siddhi Chandrashekhar Mayekar, Karnataka (IN); Rajdeep Kaur, Karnataka (IN); Ayush Raj, Karnataka (IN); Lalith Kumar, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 16/666,980

(22) Filed: Oct. 29, 2019

(65) Prior Publication Data
US 2020/0137710 A1 Apr. 30, 2020

(30) Foreign Application Priority Data
Oct. 29, 2018 (IN) .............................. 201841040835

(51) Int. Cl.
*H04W 60/00* (2009.01)
*H04L 29/06* (2006.01)
*H04W 8/02* (2009.01)
*H04W 84/04* (2009.01)
*H04W 88/06* (2009.01)

(52) U.S. Cl.
CPC ....... *H04W 60/005* (2013.01); *H04L 65/1016* (2013.01); *H04W 8/02* (2013.01); *H04W 84/042* (2013.01); *H04W 88/06* (2013.01)

(58) Field of Classification Search
CPC ... H04W 60/005; H04W 8/02; H04W 84/042; H04W 88/06; H04L 65/1016
USPC ....................................... 455/435.1
See application file for complete search history.

(56) References Cited

U.S. PATENT DOCUMENTS

| 2012/0182912 A1* | 7/2012 | Watfa | H04W 36/125 370/311 |
| 2014/0018039 A1* | 1/2014 | Lau | H04W 8/20 455/411 |
| 2016/0135093 A1 | 5/2016 | Wong et al. | |
| 2017/0070877 A1* | 3/2017 | Shi | H04W 4/12 |

(Continued)

FOREIGN PATENT DOCUMENTS

| CN | 107466114 | 12/2017 |
| WO | 2018006017 | 1/2018 |

(Continued)

Primary Examiner — Michael R Neff
(74) Attorney, Agent, or Firm — F. Chau & Associates, LLC

(57) ABSTRACT

Embodiments herein disclose a method for handling dual registration of user equipment (UE) in a wireless communication system. The method includes registering the UE on a fourth generation Radio Access Technology (4G RAT) and a fifth generation RAT (5G RAT). Further, the method includes determining, by the UE, an occurrence of at least one event. Further, the method includes suspending, by the UE, the registration on the 5G RAT. Further, the method includes performing, by the UE, communication using the registration on the 4G RAT.

15 Claims, 24 Drawing Sheets

(56) References Cited

U.S. PATENT DOCUMENTS

2019/0021064 A1    1/2019  Ryu et al.
2019/0075537 A1*   3/2019  Wu ...................... H04W 36/14
2019/0166517 A1*   5/2019  Niemi ............... H04W 28/0215
2019/0182296 A1    6/2019  Zeng et al.

FOREIGN PATENT DOCUMENTS

WO    2018008944    1/2018
WO    2018008980    1/2018

* cited by examiner

Network allows dual-registration even with N26 Link

METHOD AND USER EQUIPMENT FOR HANDLING DUAL REGISTRATION IN WIRELESS COMMUNICATION SYSTEM

CROSS REFERENCES

This application claims priority to, and the benefit of, Indian Provisional Application Serial No. 201841040835 filed on Oct. 29, 2018. The entire contents of the foregoing application are hereby incorporated by reference for all purposes.

FIELD OF INVENTION

The present disclosure related to a wireless communication system, and is more specifically related to a method and system for enhancements for new radio-long term evolution (NR-LTE) dual registration operations.

BACKGROUND

Wireless networks connect a wide variety of different computers and communications equipment using wireless signals. Homes, telecommunication networks, and businesses use wireless technology to increase convenience and reduce the use of costly wiring. Wireless communication is often implemented and administered using radio waves.

With the advent of a fifth-generation wireless network (5G), networks are adopting a service-oriented architecture using network slicing (i.e., multiple logical networks that share a common physical infrastructure). High definition (HD) streaming services, network-assisted routing control for Global Positioning System (GPS), and the internet of things (IoT) are examples of services that may use 5G networking. Services are provided using separate Public Data Networks (PDNs) which may have a dedicated bandwidth for each service.

In some cases, a user equipment may not register correctly during Public Land Mobile Network (PLMN) selection to Registered Public Land Mobile Networks (RPLMNs) and equivalent PLMN's that are reported using different modes. Therefore, a method for handling dual registration in a wireless communication system is desired.

SUMMARY

Embodiments of the present disclosure provide systems and methods for handling dual registration in a wireless communication system, when an interface (e.g., an N26 interface) is supported between a 4G core (4GC) Mobility Management Entity (MME) and a 5G core (5GC) Access and Mobility Management Function (AMF). The methods may include registering the UE on a 4G radio access technology (RAT) and a 5G RAT. Further, the method includes determining, by the UE, an occurrence of at least one event. Further, the method includes suspending, by the UE, the registration on the 5G RAT. Further, the method includes performing, by the UE, communication using the registration on the 4G RAT.

In an embodiment, registering the UE on the 4G RAT and the 5G RAT includes registering the UE on the 5G RAT, detecting that an IMS service is unavailable on the 5G RAT, and registering on the 4G RAT. In an embodiment, registering the UE on the 4G RAT and the 5G RAT includes registering the UE on the 4G RAT, detecting that the IMS service is unavailable on the 4G RAT, and registering on the 4G RAT. In an embodiment, the at least one event includes an unavailability of a Circuit Switched Fallback (CSFB) on the 4G RAT, a service loss or failure at the 4G RAT, and a mobility of the UE to a 2G or 3G network.

Accordingly, the embodiments herein provides a method for handling a dual registration in a wireless communication system. The method includes registering, by a UE, on a first RAT. Further, the method includes determining, by the UE, whether a common PLMN is available in a RPLMN and equivalent PLMN list currently available with the first RAT and a RPLMN and equivalent PLMN list previously received from the second RAT, or determining, by the UE, whether an EHPLMN is available in each of the RPLMN and equivalent PLMN list currently available with the first RAT and the RPLMN and equivalent PLMN list previously received from the second RAT. Further, the method includes performing, by the UE, one of: in response to determining that the common PLMN is not available or EHPLMN is not available, registering the UE on the second RAT using the RPLMN and equivalent PLMN list currently available with the first RAT, and in response to determining that the common PLMN is available or EHPLMN is available, registering the UE on the second RAT using the RPLMN and equivalent PLMN list previously received from the second RAT. Further, the method includes triggering, by the UE, a registration on the second RAT using the RPLMN and equivalent PLMN list previously received from the second RAT in response to determining that the common PLMN is available or EHPLMN is available.

In an embodiment, registering the UE on the second RAT using the RPLMN and equivalent PLMN list currently available with the first RAT includes triggering a registration on the second RAT using the RPLMN and equivalent PLMN list currently available with the first RAT, registering the UE on the second RAT using the RPLMN and equivalent PLMN list currently available with the first RAT, determining whether the UE the registration of the UE on the second RAT is successful or unsuccessful, and performing, by the UE, one of retaining the UE registration on the first RAT and the second RAT in response to determining that the registration of the UE on the second RAT is successful, and registering the UE on the second RAT using the RPLMN and equivalent PLMN list previously received from the second RAT in response to determining that the registration of the UE on the second RAT is unsuccessful.

In an embodiment, the first RAT is a 5G RAT and the second RAT is a 4G RAT. In an embodiment the first RAT is a 4G RAT and the second RAT is a 5G RAT.

Accordingly, the embodiments herein provides a UE for handling a dual registration in a wireless communication system, when 'N26' interface is supported between MME (4GC) and AMF (5GC). The UE includes a processor coupled with a memory. The processor is configured to register on a 4G RAT and a 5G RAT. The processor is configured to determine an occurrence of at least one event and suspend the registration on the 5G RAT. The processor is configured to perform communication using the registration on the 4G RAT.

Accordingly, the embodiments herein provides an UE for handling a dual registration in a wireless communication system. The UE includes a processor coupled with a memory. The processor is configured to register on a first RAT. The processor is configured to determine whether a common PLMN is available in a RPLMN and equivalent PLMN list currently available with the first RAT and a RPLMN and equivalent PLMN list previously received from the second RAT, or determine whether an Equivalent Home PLMN (EHPLMN) is available in each of the RPLMN and equivalent PLMN list currently available with the first RAT and the RPLMN and equivalent PLMN list previously received from the second RAT. The processor is configured to perform one of in response to determining that the common PLMN is not available or EHPLMN is not available, register the UE on the second RAT using the RPLMN and equivalent PLMN list currently available with the first RAT, or in response to determining that the common PLMN is available or EHPLMN is available, register the UE on the second RAT using the RPLMN and equivalent PLMN list previously received from the second RAT. The processor is configured to trigger a registration on the second RAT using the RPLMN and equivalent PLMN list previously received from the second RAT in response to determining that the common PLMN is available or EHPLMN is available.

Accordingly, the embodiments herein provides a method for handling a dual registration in a wireless communication system. The method includes determining, by the wireless communication system, where a UE has to perform dual registration on a 4G RAT and a 5G RAT. Further, the method includes adding, by the wireless communication system, an HPLMN as part of an EPLMN list. Further, the method includes providing the updated EPLMN list to the UE during one of an attach procedure and an update procedure in at least one of the 4G RAT and 5G RAT.

Accordingly, the embodiments herein provides a wireless communication system for handling a dual registration. The wireless communication system is configured to determine where a UE has to perform dual registration on a 4G RAT and a 5G RAT and add an HPLMN as part of an EPLMN list. The wireless communication system is configured to provide the updated EPLMN list to the UE during one of an attach procedure and an update procedure in at least one of the 4G RAT and 5G RAT.

In an embodiment, a method of wireless communication comprises registering a UE on a first RAT and a second RAT different from the first RAT, wherein the registering comprises a dual-registration on the first RAT and the second RAT; identifying at least one condition from a list comprising: an unavailability of a CSFB on the first RAT, a service loss or failure at the first RAT, and a mobility of the UE to a 2G network or a 3G network; suspending the registration on the second RAT based on the at least one condition; and communicating using the first RAT based at least in part on suspending the registration on the second RAT.

These and other aspects of the embodiments herein will be better appreciated and understood when considered in conjunction with the following description and the accompanying drawings. It should be understood, however, that the following descriptions, while indicating various embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Systems and methods are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
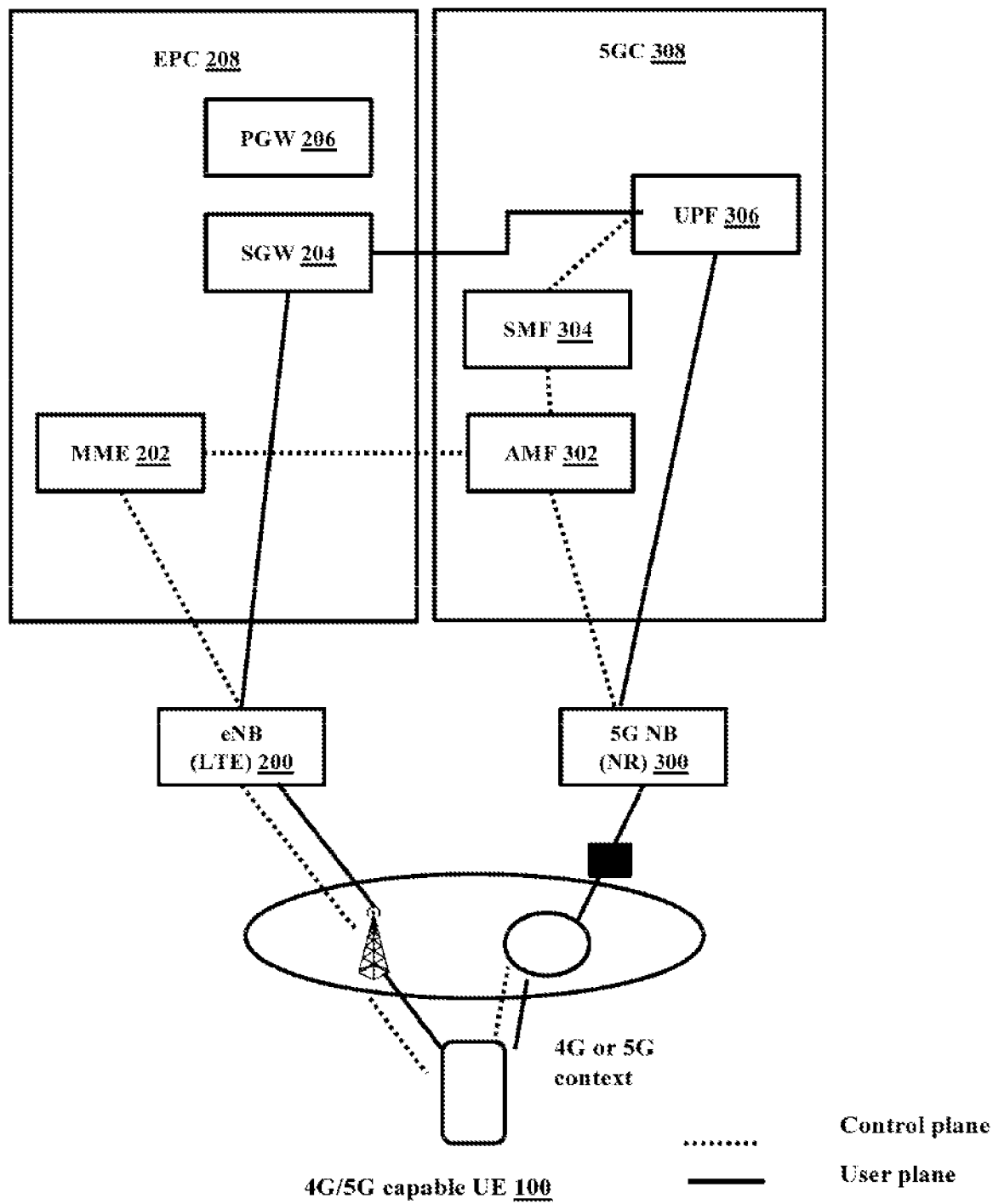
FIG. 1 is a schematic diagram illustrating a 4G or 5G CN-level interworking with single registration, according to a prior art.

Embodiments of the present disclosure, and the various features and details thereof, are explained more fully with reference to the non-limiting embodiments that are illustrated in the accompanying drawings and detailed in the following description. Descriptions of well-known components and processing techniques are omitted to not unnecessarily obscure the embodiments herein. Additionally, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for handling a dual registration process in a wireless communication system, when an interface (e.g., an N26 interface) is present between a 4GC and a 5GC. The method includes registering the user equipment (UE) on a fourth-generation Radio Access Technology (4G RAT) and a fifth-generation RAT (5G RAT). Further, the method includes determining, by the LIE, an occurrence of at least one event. Further, the method includes suspending, by the UE, the registration on the 5G RAT. Further, the method includes performing, by the UE, communication using the registration on the 4G RAT.

Unlike conventional methods, the present disclosure can be used to enhance the new radio-long term evolution (NR-LTE) dual registration operation. In the present disclosure, the operation in the dual registration mode is fully dependent on UE's implementation, and the UE can use various information such as location details, previous registration information, 5G subscription information, etc. along with IWK N26 support from the network to determine when to switch to dual registration mode. The UE may not rely on an IMS voice availability to enable or disable N1 mode, where the UE may enable or disable a dual registration mode when the IMS voice is not available to provide 5G services to the user. The UE may ensure 5G services are available to the user as long as UE is in a 4G service and prioritize voice service over long term evolution (LTE) service. The network may make use of "UE status" IE in "REGISTRATION REQUEST" message to not clear the EPS Mobility Management (EMM) registration context. Upon reception of rejection #12, #13 while operating in dual registration mode, and while the UE is already registered on the other RAT, the UE may move to single registration mode and shift the Public Data Networks (PDNs) to the registered RAT. The UE may avoid performing any new PLMN selection on the rejected RAT. The UE may also continue to remain in NORMAL-SERVICE on the registered RAT. The UE may also periodically search for new tracking area identifiers (TAIs) of the RPLMN or EPLMN of the rejected RAT so as to move to the dual registration mode.

The method can be used to provide seamless mobility of unicast and Multimedia Broadcast Multicast Service (MBMS) services during UE mobility across MBMS to non-MBMS region. The method provides a seamless user experience as service interruption is reduced/eliminated. The method does not have MBMS loss or conflict with SIB/RAR decode operation. In the present disclosure, the unicast connection is sustained.

The UE may provide Circuit Switched Fallback (CSFB) call support on LTE and simultaneously provide 5G services on NR in dual registration mode irrespective of 'N26' availability if the UE is in service in LTE. If the UE switches RAT to 3G/2G or loses service on 4G, the UE may switch back to single registration mode and recede from the 5G service. The UE may ensure 5G services are available to the user if the UE is in 4G service and prioritizes voice service over 5G service when 40 is not in service.

FIG. 1 is a schematic diagram illustrating a 4G or 5G CN-level interworking with single registration, according to a prior art. The UE 100 is connected with the eNb 200 and the 5G NB 300. The EPC 208 includes an MME 202, an SGW 204 and a PGW 206. The 5GC 308 includes an AMF 302, a SMF 304, and a UPF 306.

In single-registration mode, the UE 100 has one active mobility management (MM) state (either rate matching (RM) state in 5GC or EMM state in EPC 208), and UE 100 is either in 5GC non-access stratum (NAS) mode or in EPC NAS mode (when connected to 5GC 308 or EPC 208, respectively). The UE 100 maintains a single coordinated registration for the 5GC 308 and the EPC 208. Accordingly, the UE 100 maps the EPS Globally Unique Temporary ID (GUTI) to 5G GUTI during mobility between the EPC 208 and the 5GC 208. To enable re-use of a previously established 5G security context when returning to the 5GC 308, the UE 100 also keeps the native 5G-GUTI and the native 5G security context when moving from the 5GC 308 to the EPC 208.

Figure 2:
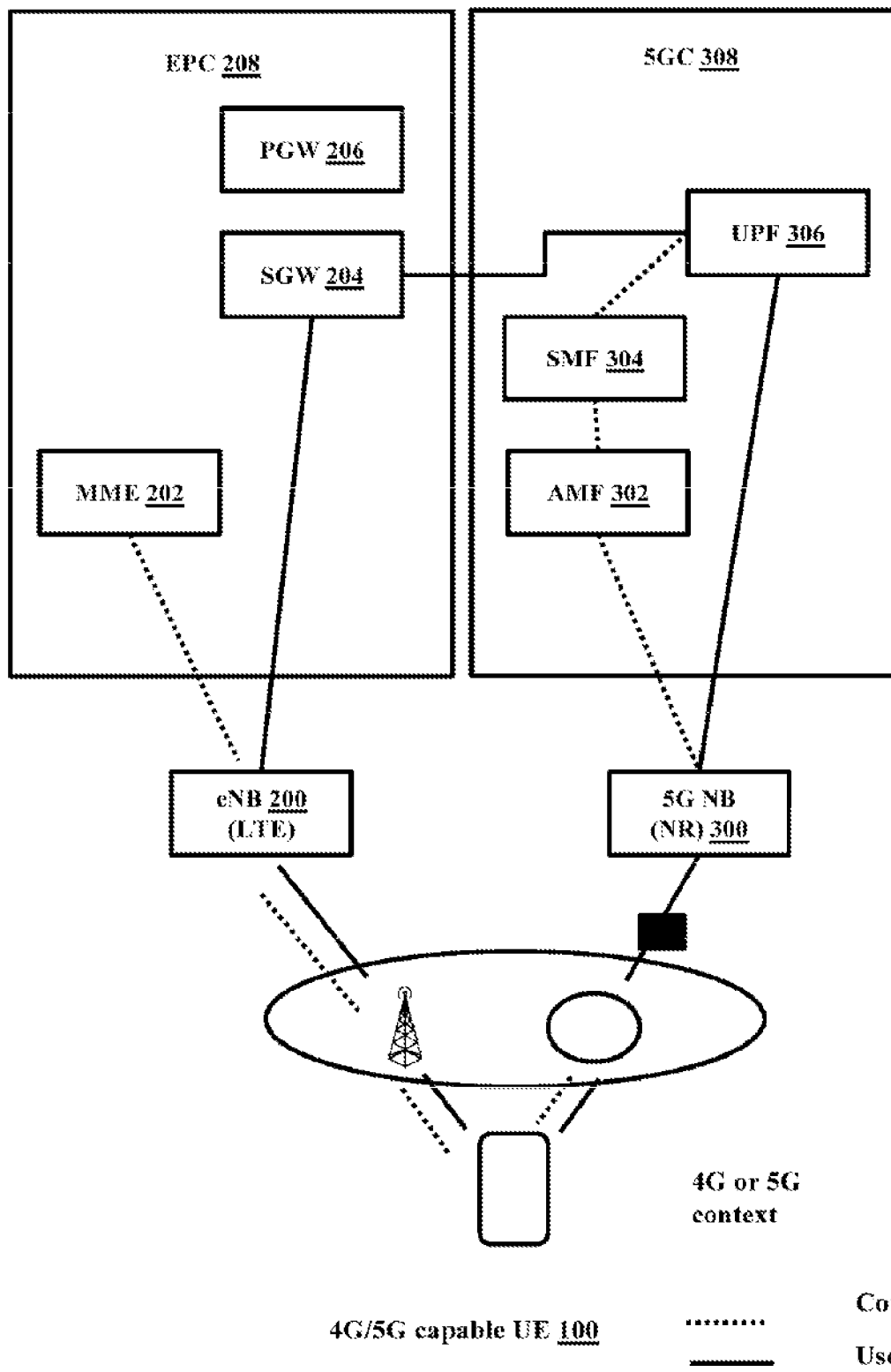
FIG. 2 is a schematic diagram illustrating a 4G or 5G CN-level interworking with dual registration, according to a prior art.

FIG. 2 is a schematic diagram illustrating a 4G or 5G CN-level interworking with dual registration, according to a prior art. In an NR-LTE supported UE, the dual registration has been introduced where the UE 100 can operate simultaneously over 4G and 5G with separate radio connections when there is no support of an interface between the MME 202 and an AMF 302 (mobility modules in 40 and 5G respectively). When there is no interworking between the LTE and the 5G 'N26' interface between the AMF 302 and the MME 202 is absent, the UE 100 enters into the dual-registration mode. Information about the interworkings are received in the LTE, and the 5G registration accept process.

Figure 3:
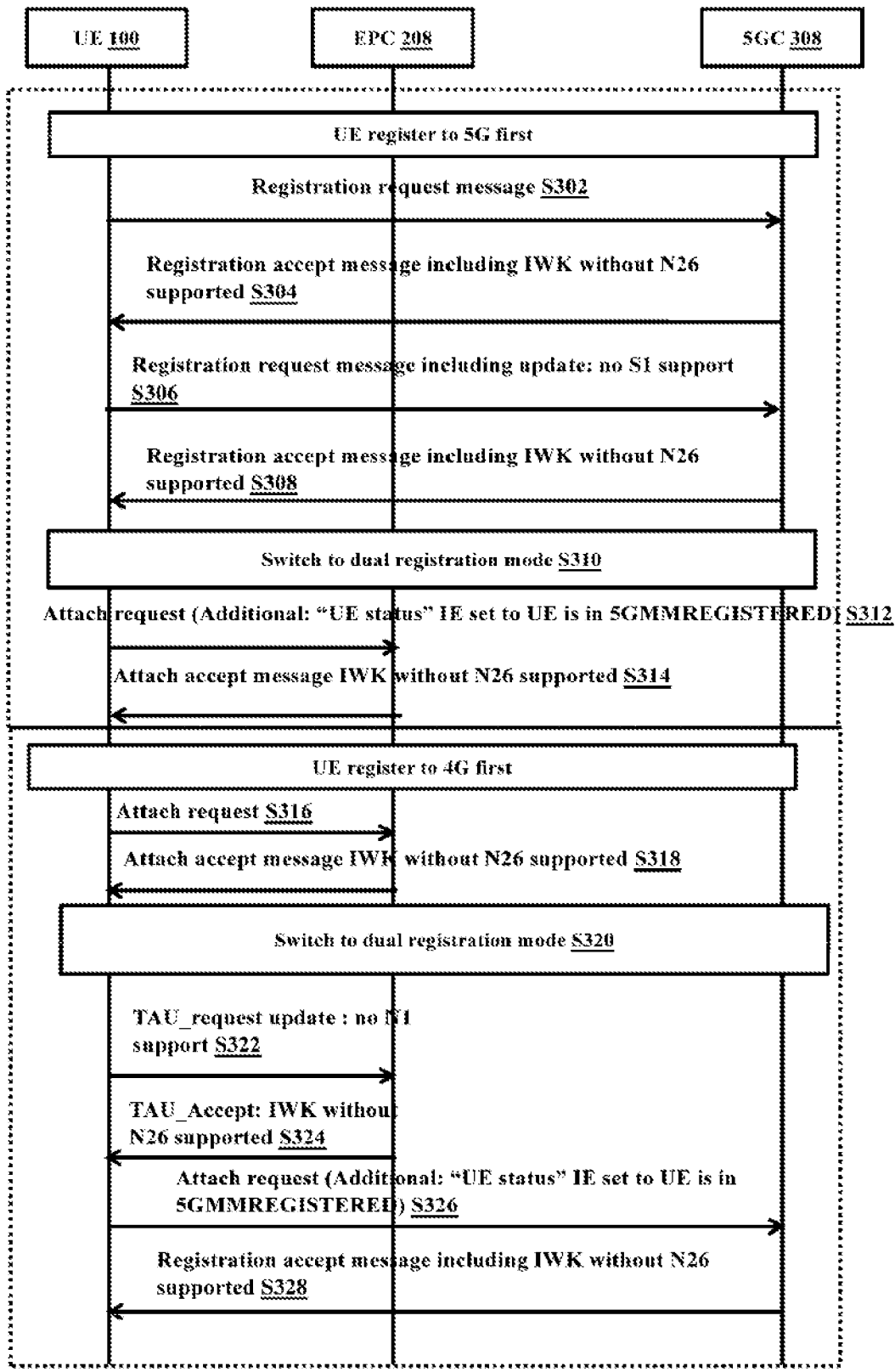
FIG. 3 is a sequential diagram of various operation performs in between a UE, an evolved packet core (EPC) and a 5GC, where interworking (IWK) between the EPC and the 5GC supported without N26 interface, according to a prior art.

FIG. 3 is a sequential diagram of various operation performs among the UE 100, the EPC 208 and 5GC 308, where IWK between the EPC 208 and the 5GC 308 supported without N26 interface, according to a prior art. According to 3GPP TS 24.501, if both 5GMM and EMM are enabled, the UE 100 which is capable of N1 mode and S1 mode and is operating in the dual-registration mode may maintain independent registrations for the 5GMM and the EMM independently. Also, the UE 100 operating in a dual registration mode may register in the EPC 208 ahead of any protocol data unit (PDU) session transfer using an attach procedure indicating that the UE 100 is moving from the 5GC 308 without establishing a PDN connection in the EPC 208 if the EPC 208 supports an evolved packet system (EPS) attach without PDN connectivity as defined in TS 23.401. The support for the EPS may attach without PDN connectivity may occur for the UE 100 supporting dual-registration procedures.

According to 3GPP TS 23.501, in the dual-registration mode, the UE 100 handles independent registrations for the 5GC 308 and the EPC 208 using separate radio resource control (RRC) connections. In the dual-registration mode, the UE 100 maintains 5G-GUTI and EPS-GUTI independently. In the dual-registration mode, the UE 100 provides native 5G-GUTI, if previously allocated by the 5GC 308, for registrations towards the 5GC 308. The UE 100 provides native EPS-GUTI, if previously allocated by the EPC 208, for attaching or tracking area update (TAU) towards the EPC 208. In dual-registration mode, the UE 100 may be registered to the 5GC 308, EPC, or to both 5GC 308 and the EPC 208. The dual-registration mode is intended for interworking between EPS/E-UTRAN and 5GS/NR. The dual-registered UE 100 should not send its E-UTRA capability to the NR access when connected to 5GS/NR to avoid being handed over to 5GC-connected E-UTRA.

The 3GPP TS 24.501 has limited the NR capability of the device when IMS voice is enabled when operating in the single registration mode. Change of IMS voice availability for the UE 100 in single-registration mode is given in Table 1.

TABLE 1

Change of IMS voice availability for a UE in single-registration mode.

| Change of IMS voice available condition | Procedure to execute |
| --- | --- |
| "IMS voice not available" over 3GPP access and the UE's usage setting is "voice-centric." | Disable the N1 mode capability (see sub-clause 4.9.2) |

With the above statement, the 3GPP has limited the usage of NR capability when the IMS voice service is available and hence when the IMS is not available for various reasons, e.g. IMS disabled by a user/IMS registration retry is ongoing/IMS registration is rejected permanently due to subscription, etc., 5G services may not be available. When the IMS service is unavailable, even though the UE 100 supports the NR mode, dual registration and has valid subscriptions for different services offered in 5G, user wouldn't be able to use them as the NR mode may be disabled as per the above clause.

As shown in the FIG. 3, at S302, the UE 100 sends the registration request message to the 5GC 308. At S304, the 5GC 308 sends a registration accept message indicating IWK without N26 supported to the UE 100. At S306, the UE 100 sends the registration request message including update: no S1 support to the 5GC 308. At S308, the 5GC 308 sends the registration accept message including the IWK without N26 supported to the UE 100. At S310, the UE 100 switches to the dual registration mode. At S312, UE 100 sends the attach request message including additional: "UE status" IE set to UE is in a 5GMMREGISTERED to the EPC 208. At S314, the EPC 208 sends an attach accept message including IWK without N26 supported to the UE 100.

At S316, the UE 100 sends the attach request to the EPC 208. At S318, the EPC 208 sends the attach accept message indicating an IWK without N26 supported to the UE 100. At S320, the UE 100 switches to the dual registration mode. At 322, the UE 100 sends the TAU_request update: no N1 support to the EPC 208. At S324, the EPC 208 sends the TAU_Accept: IWK without N26 supported to the UE 100. At S326, the UE 100 sends the attach request message including Additional: "UE status" IE set to UE is in the 5GMMREGISTERED to the 5GC 308. At S328, the 5GC 308 sends the registration accept message including IWK without N26 supported to the UE 100.

Figure 4:
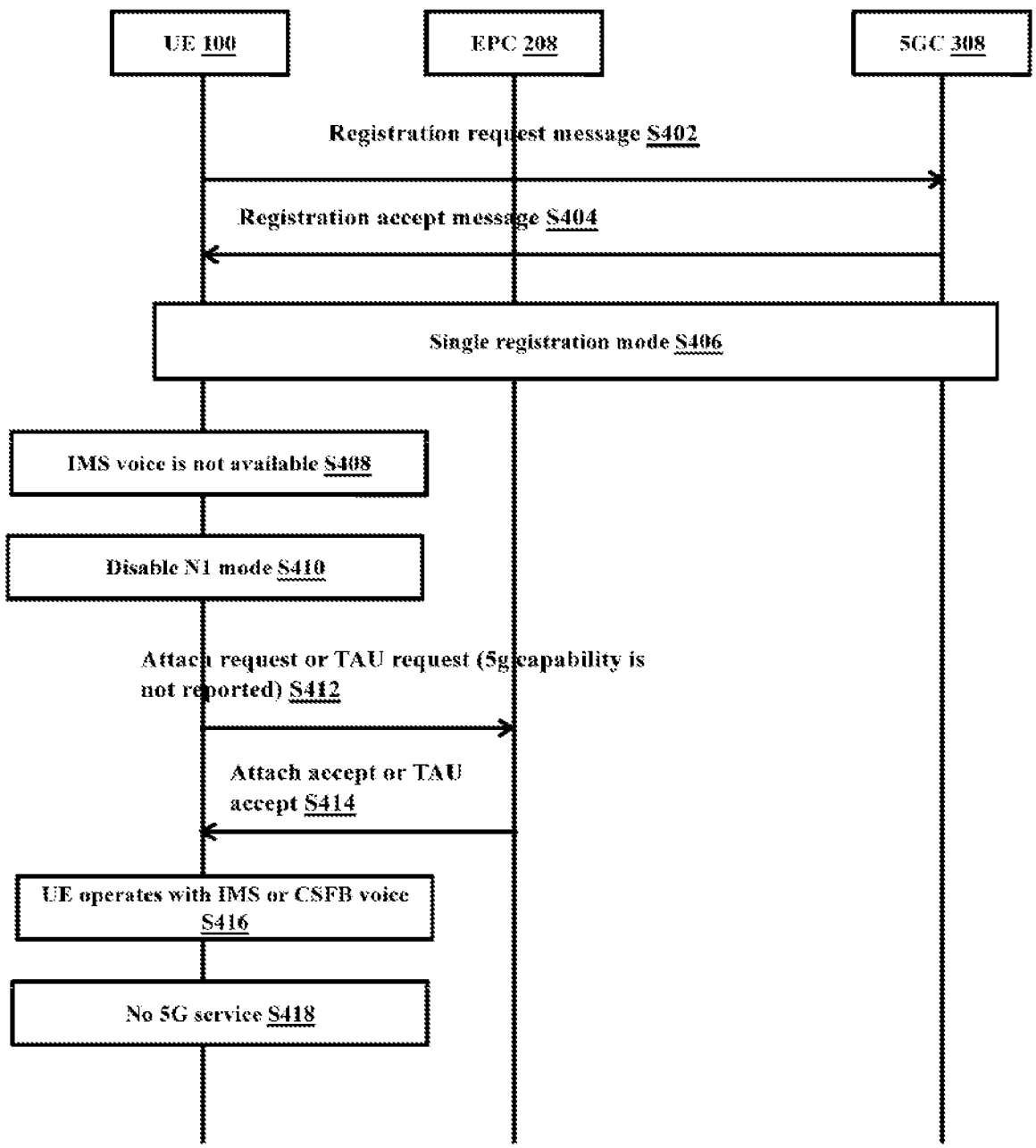
FIG. 4 is a sequential diagram of various operation performs in between the UE, the EPC, and the 5GC, where IWK between the EPC and the 5GC supported using a N26 interface, according to a prior art.

FIG. 4 is a sequential diagram of various operation performs in between the UE 100, the EPC 208 and the 5GC 308, where the IWK between the EPC 208 and the 5GC 308 supported using N26 interface, according to a prior art. In an example scenario, a user disabled IMS but registered for the HD streaming services over the 5G. Since the IMS is disabled, the user cannot enjoy the streaming service even though the user is operating in a strong 5G network area.

As shown in the FIG. 4, at S402, the UE 100 sends the registration request message to the 5GC 308. At S404, the 5GC 308 sends the registration accept message to the UE 100. At S406, the UE 100 is in a single registration mode. At S408, UE 100 detects that IMS voice is not available. At S410, the UE 100 disables the N1 mode. At S412, the UE 100 sends the attach request or TAU request (5G capability is not reported) to the EPC 208. At S414, the EPC 208 sends the attach accept message or the TAU accept message to the UE 100. At S416, the UE 100 operates with IMS or CSFB voice. At S418, the UE 100 does not have a 5G service.

Figure 5:
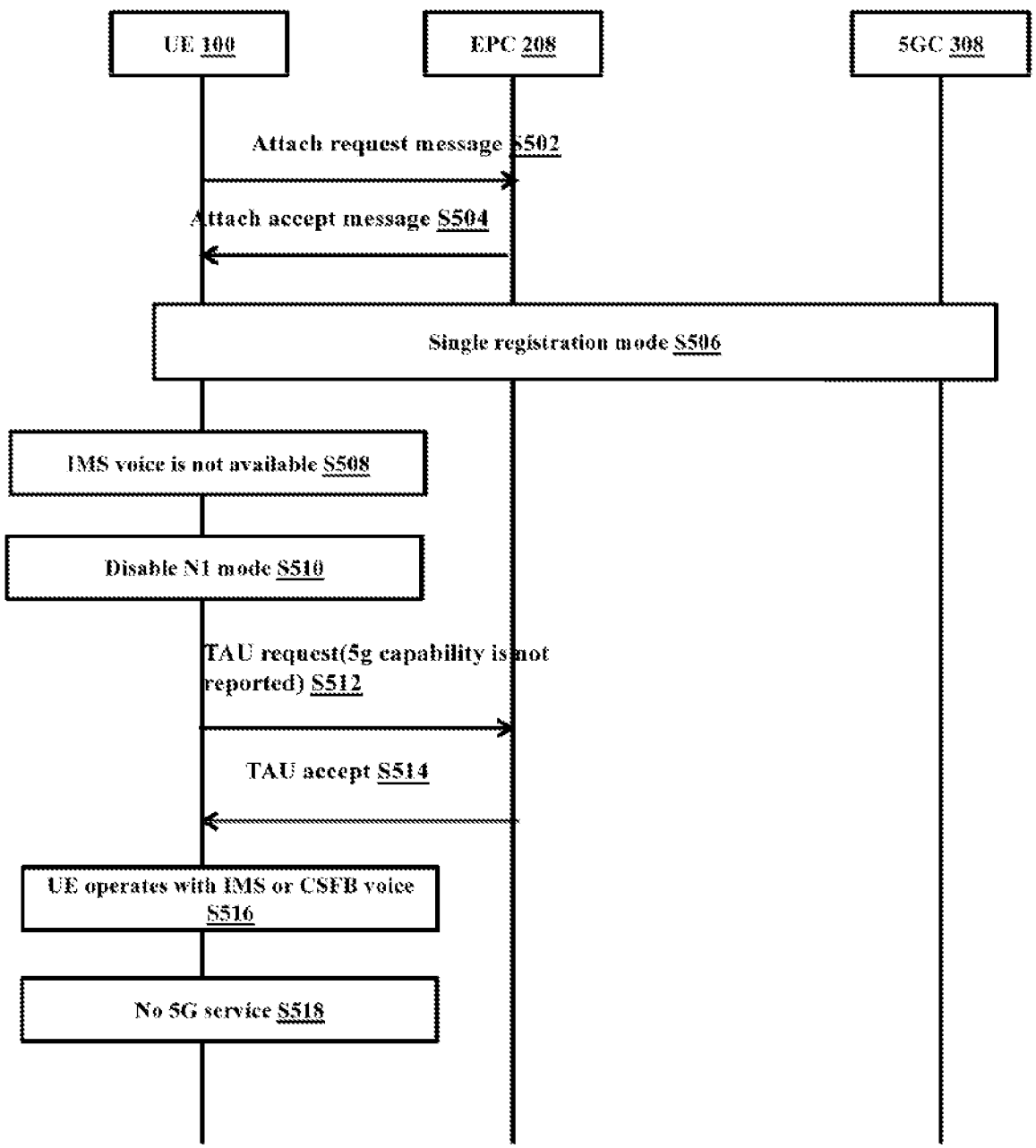
FIG. 5 is a sequential diagram of various operation performs in between the UE, the EPC, and the 5GC, where IWK between the EPC and the 5GC supported using the N26 interface, according to a prior art.

FIG. 5 is a sequential diagram of various operations performing in between the UE 100, the EPC 208 and the 5GC 308, where IWK between the EPC 208 and the 5GC 308 supported using an N26 interface, according to prior art. In another example scenario, the IMS is enabled, but the IMS registration faces issues due to an IMS server, and IMS voice is disabled for a long time. As IMS voice is not available even though the IMS is enabled, 5G services could be disabled. The 5G services may not be available even though user is operating in the strong 5G network area.

As shown in the FIG. 5, at S502, the UE 100 sends the registration request message to the EPC 208. At S504, the EPC 208 sends the registration accept message to the UE 100. At S506, the UE 100 is in the single registration mode. At S508, UE 100 detects that IMS voice is not available. At S510, the UE 100 disables the N1 mode. At S512, the UE 100 sends the TAU request (5G capability is not reported) to the EPC 208. At S514, the EPC 208 sends the TAU accept message to the UE 100. At S516, the UE 100 operates with IMS or CSFB voice. At S518, the UE 100 does not have 5G service.

Figure 6:
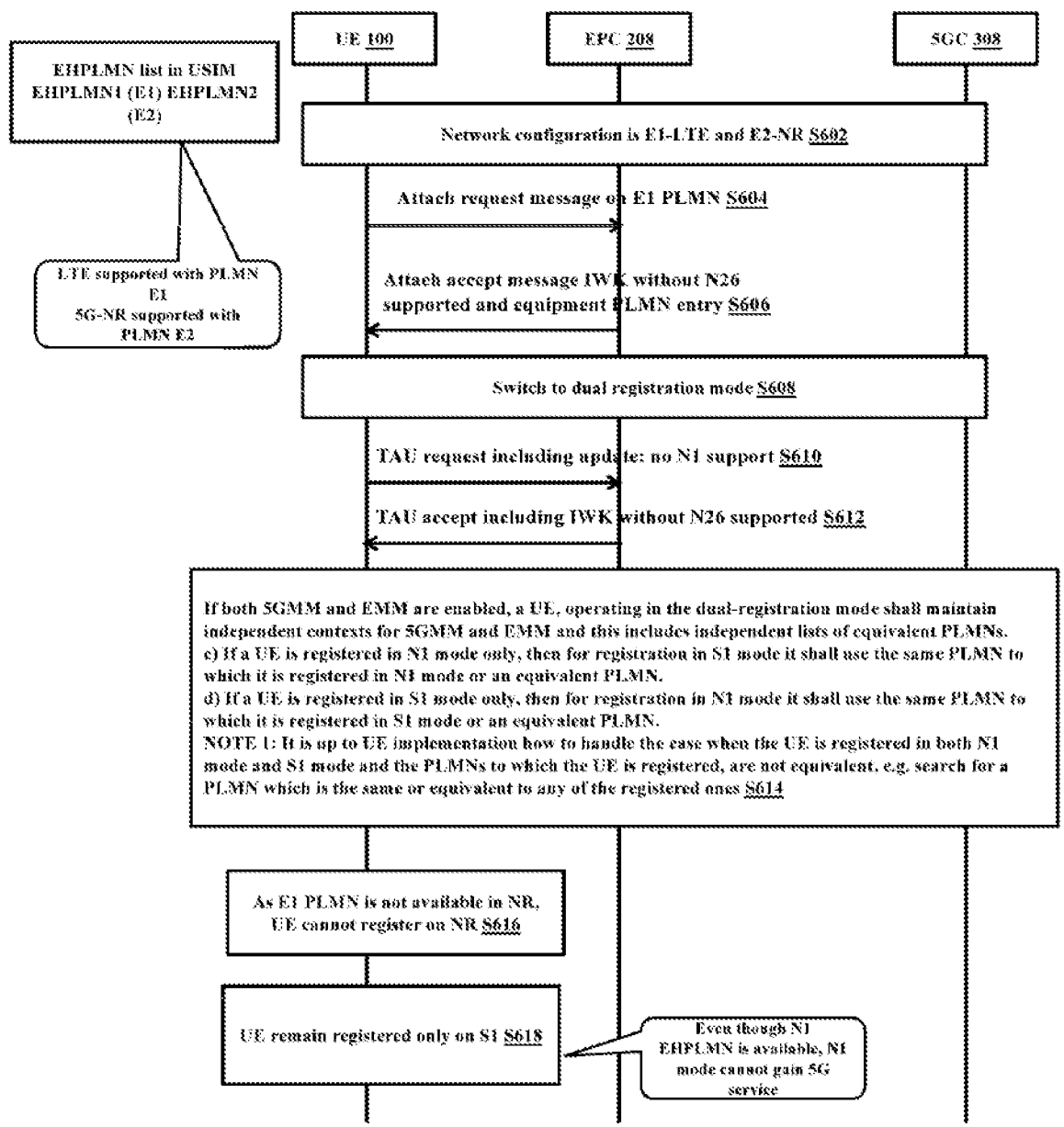
FIG. 6 is a sequential diagram of various operation performs in between the UE, the EPC, and the 5GC, where different EHPLMNs on LTE and N1 during PLMN selection in dual registration, according to a prior art.

FIG. 6 is a sequential diagram of various operation performs in between the UE 100, the EPC 208 and the 5GC 308, where different EHPLMNs on LTE and N1 during PLMN selection in the dual registration, according to prior art.

At S602, consider the network configuration is E1-LTE and E2-NR. At S604, the UE 100 sends the attach request message on E1 PLMN to the EPC 208. At S606, the EPC 208 sends the attach accept message including the IWK without N26 supported and equipment PLMN entry to the UE 100. At S608, the UE 100 switches to the dual registration mode. At S610, the UE 100 sends the TAU request including update: no N1 support to the EPC 208. At S612, the EPC 208 sends the TAU accept including IWK without N26 supported to the UE 100. At S614, if both 5GMM and EMM are enabled, the UE 100, operating in the dual-registration mode may maintain independent contexts for 5GMM and EMM and this includes independent lists of equivalent PLMNs, a) If a UE is registered in N1 mode, then for registration in S1 mode UE 100 may use the same PLMN to which UE 100 is registered in N1 mode or an equivalent PLMN. b) If the UE 100 is registered in S1 mode, then for registration in N1 mode UE 100 may use the same PLMN to which UE 100 is registered in S1 mode or an equivalent PLMN. It is up to UE implementation how to handle the case when the UE 100 is registered in both N1 mode and S1 mode and the PLMNs to which the UE 100 is registered, are not equivalent, e.g. search for a PLMN which is the same or equivalent to any of the registered ones. At S616, as E1 PLMN is not available in the NR, the UE 100 cannot register on the NR. At S618, the UE 100 remains registered on S1 mode, even though N EHPLMN is available, N1 mode cannot gain 5G service.

Figure 7:
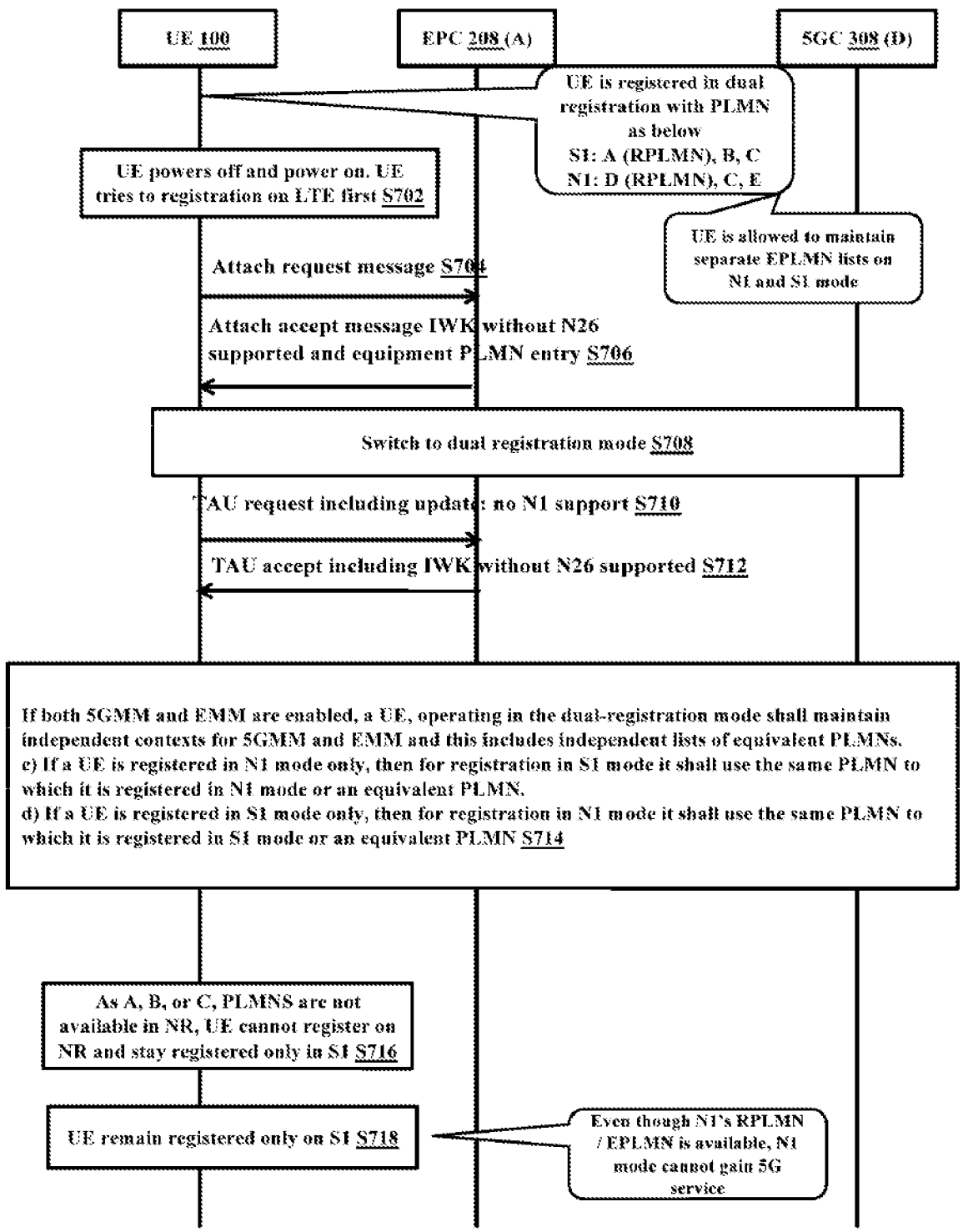
FIG. 7 is a sequential diagram of various operation performs in between the UE, the EPC, and the 5GC, where RPLMNs and EPLMNs are unavailable during PLMN selection in dual registration, according to a prior art.

FIG. 7 is a sequential diagram of various operation performs in between the UE 100, the EPC 208 and the 5GC 308, where RPLMNs and EPLMNs are unavailable during PLMN selection in dual registration, according to prior art.

3GPP specification 24.501 hasn't considered the UE 100 handling upon receiving registration rejects while operating in dual registration mode. In dual-registration mode, if the UE 100 operates exactly as specified in 24.501, the UE 100 would not operate in the best possible way.

Consider, the UE 100 is registered in dual registration with PLMN as S1: A (RPLMN), B, C, N1: D (RPLMN), C, E and the UE 100 is allowed to maintain separate EPLMN lists on N1 and S1 mode.

At 702, the UE 100 powers off and power on and the UE 100 tries to registration on the LTE first. At S704, the UE 100 sends the attach request message to the EPC 208. At S706, the EPC 208 sends the attach accept message including IWK without N26 supported and equipment PLMN entry to the UE 100. At S708, the UE 100 switches to the dual registration mode. At S710, the UE 100 sends the TAU request including update: no N1 support to the EPC 208. At S712, the EPC 208 sends the TAU accept including IWK without N26 supported to the UE 100. At S714, if both 5GMM and EMM are enabled, the UE 100, operating in the dual-registration mode may maintain independent contexts for 5GMM and EMM, and this includes independent lists of equivalent PLMNs. a) If the UE 100 is registered in N1 mode, then for registration in S1 mode UE 100 may use the same PLMN to which UE 100 is registered in N1 mode or an equivalent PLMN. B) If the UE 100 is registered in S1 mode, then for registration in N1 mode UE 100 may use the same PLMN to which UE 100 is registered in S1 mode or an equivalent PLMN.

At S716, as PLMN is not available in the NR, the UE 100 cannot register on the NR. At S718, the UE 100 remains registered on S1 mode. Even though N1's RPLMN/EPLMN is available, N1 mode cannot gain 5G service.

Figure 8:
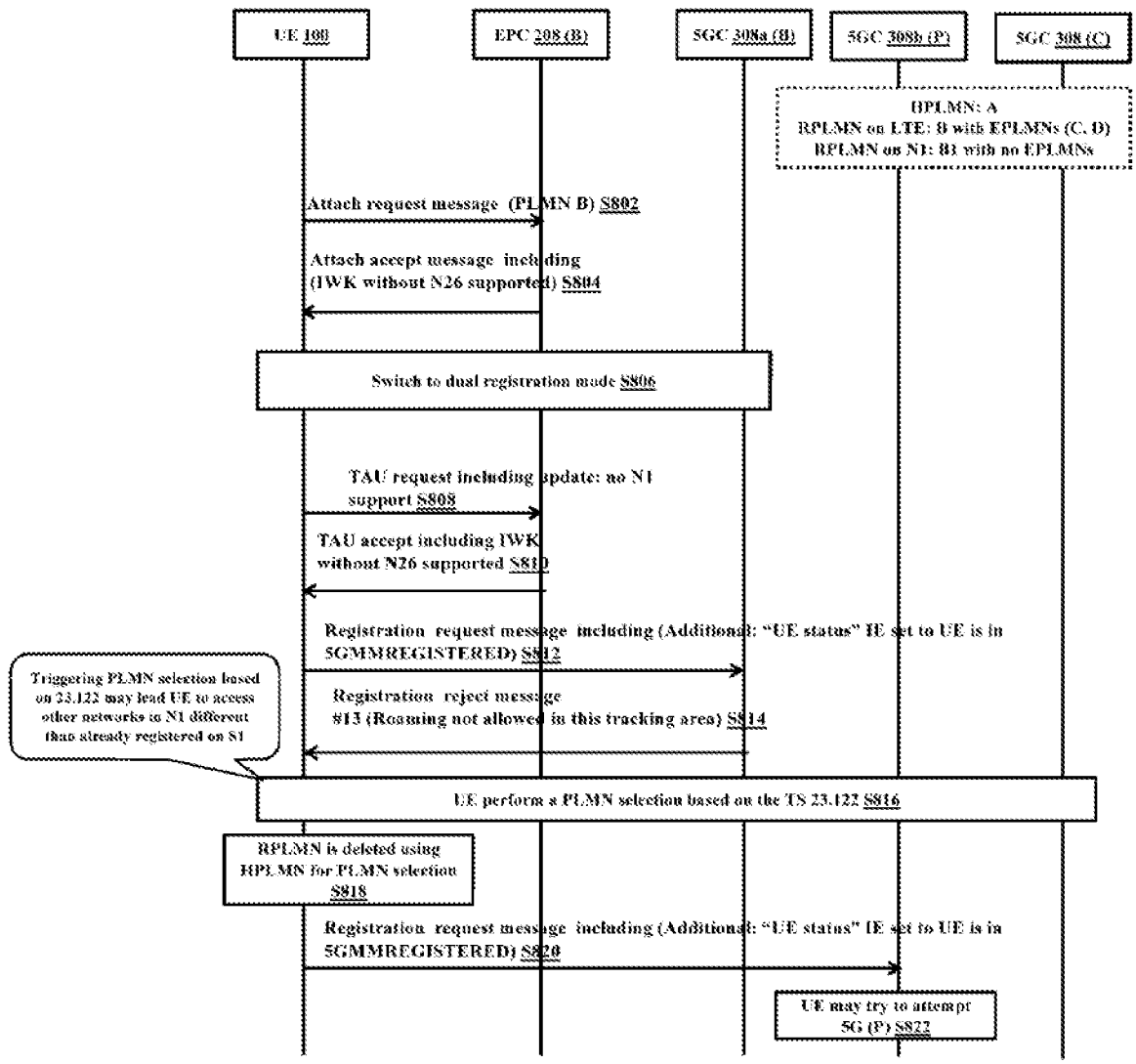
FIG. 8 is a sequential diagram of various operation performs in between the UE, the EPC and the 5GC, where the UE is registered on LTE and receives #13 rejection on N1, according to a prior art.

FIG. 8 is a sequential diagram of various operation performs in between the UE 100, the EPC 208 and the 5GC 308, where the UE 100 registered on LTE and receives #13 reject on N1, according to a prior art. The UE 100 is registered to the LTE with multiple PDNs operating in the NR mode. The UE receives #13 in NR RAT. As per TS 24.501, the NR RPLMN and EPLMN may be deleted. The UE 100 may follow PLMN selection as in TS 23.122. As per TS 23.122 search on HPLMN may be started and when UE 100 is not available, the UE might try available PLMNs in 5G (which might be different PLMN than 4G registered PLMN), and this could lead to UE not operating in dual registration mode.

At S802, the UE 100 sends the attach request message (PLMN B) to the EPC 208. At S804, the EPC 208 sends the attach accept message including IWK without N26 supported to the UE 100. At S806, the UE 100 switches to the dual registration mode. At S808, the UE 100 sends the TAU request which may include an update stating no N1 support to the EPC 208. At S810, the EPC 208 sends the TAU accept including IWK without N26 supported to the UE 100. At S812, the UE sends the registration request message including (Additional: "UE status" IE set to UE is in 5GMMREGISTERED) to the 5GC 308b. At S814, the 5GC 308a sends the registration reject message due to #13 (Roaming not allowed in this tracking area). At S816, the UE 100 performs a PLMN selection based on the TS 23.122 3GPP standard. At S818, the UE 100 determines that the RPLMN is deleted using HPLMN for PLMN selection. At S820, the UE 100 sends the registration request message including (Additional: "UE status" IE set to UE is in 5GMMREGISTERED) to the 5GC 308b. At S822, the UE 100 may try to attempt 5G (P).

Figure 9:
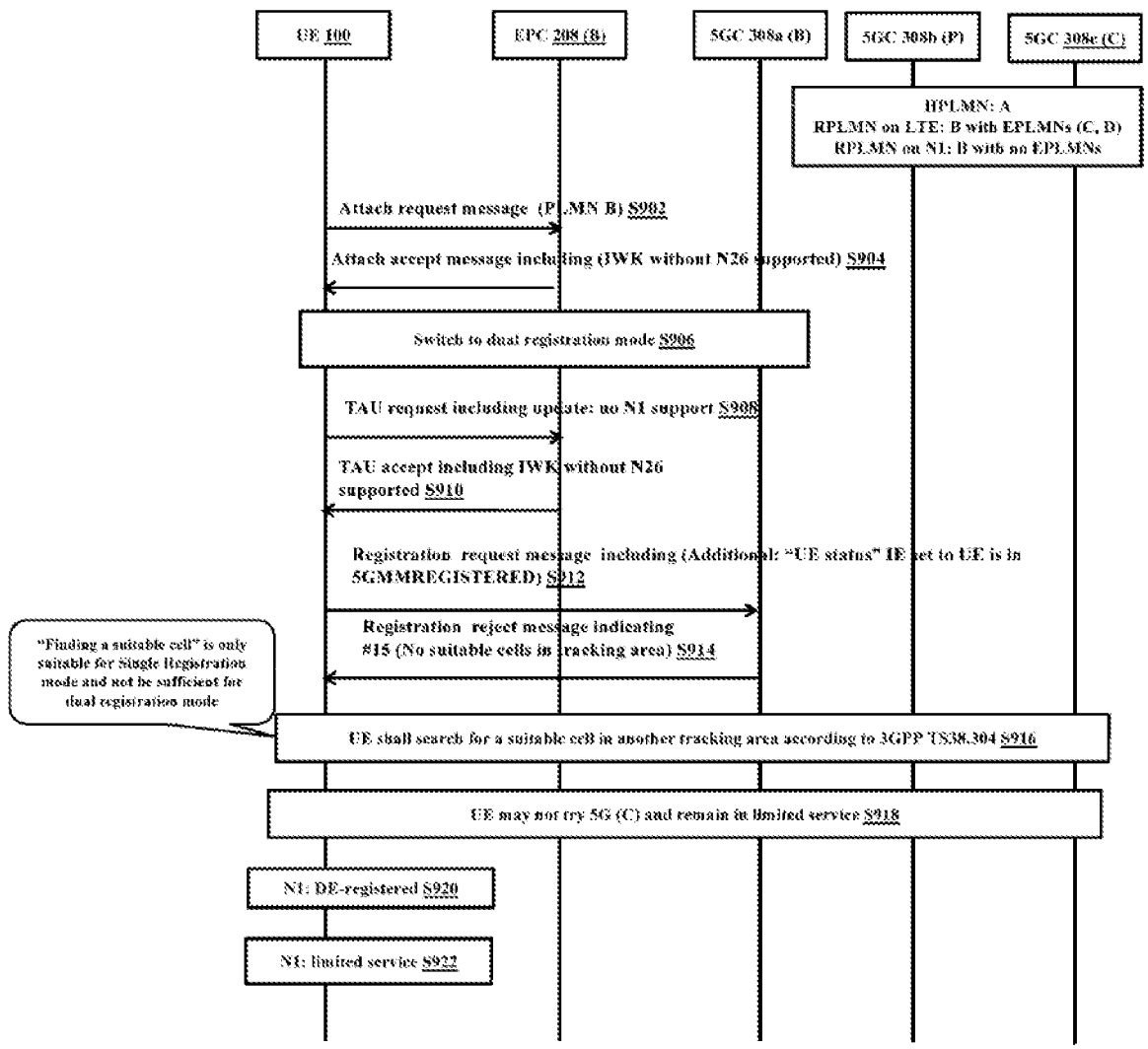
FIG. 9 is a sequential diagram of various operation performs in between the UE, the EPC and the 5GC, where the UE registered on the LTE and receives #15 rejection on N1, according to a prior art.

FIG. 9 is a sequential diagram of various operation performs in between the UE 100, the EPC 208 and the 5GC 308, where the UE 100 registered on the LTE and receives #15 reject on N1 RAT, according to a prior art. The UE 100 is registered to both NR and LTE with multiple PDNs operating in NR mode. The UE 100 receives #15 in NR rat. As per TS 24.501, the UE 100 may try to find another TAI and if not available may go to limited service. The UE 100 may not be able to receive service on available 4G EPLMNs that provide 5G services too.

At S902, the UE 100 sends an attach request message (PLMN B) to the EPC 208. At S904, the EPC 208 sends the attach accept message including IWK without N26 supported to the UE 100. At S906, the UE 100 switches to the dual registration mode. At S908, the UE 100 sends the TAU request including update: no N1 support to the EPC 208. At S910, the EPC 208 sends the TAU accept including IWK without N26 supported to the UE 100. At S912, the UE sends the registration request message including (Additional: "UE status" IE set to UE is in 5GMMREGISTERED) to the 5GC 308b. At S914, the 5GC 308a sends the registration reject message due to #15 (no suitable cells in tracking area). At S916, the UE 100 may search for a suitable cell in another tracking area according to 3GPP TS38.304. At 918, the UE 100 may not try 5G (C) and remain in limited service. At S920, the UE 100 is in N1: DE-registered and at S922, the UE 100 is in N1: limited service.

Figure 10:
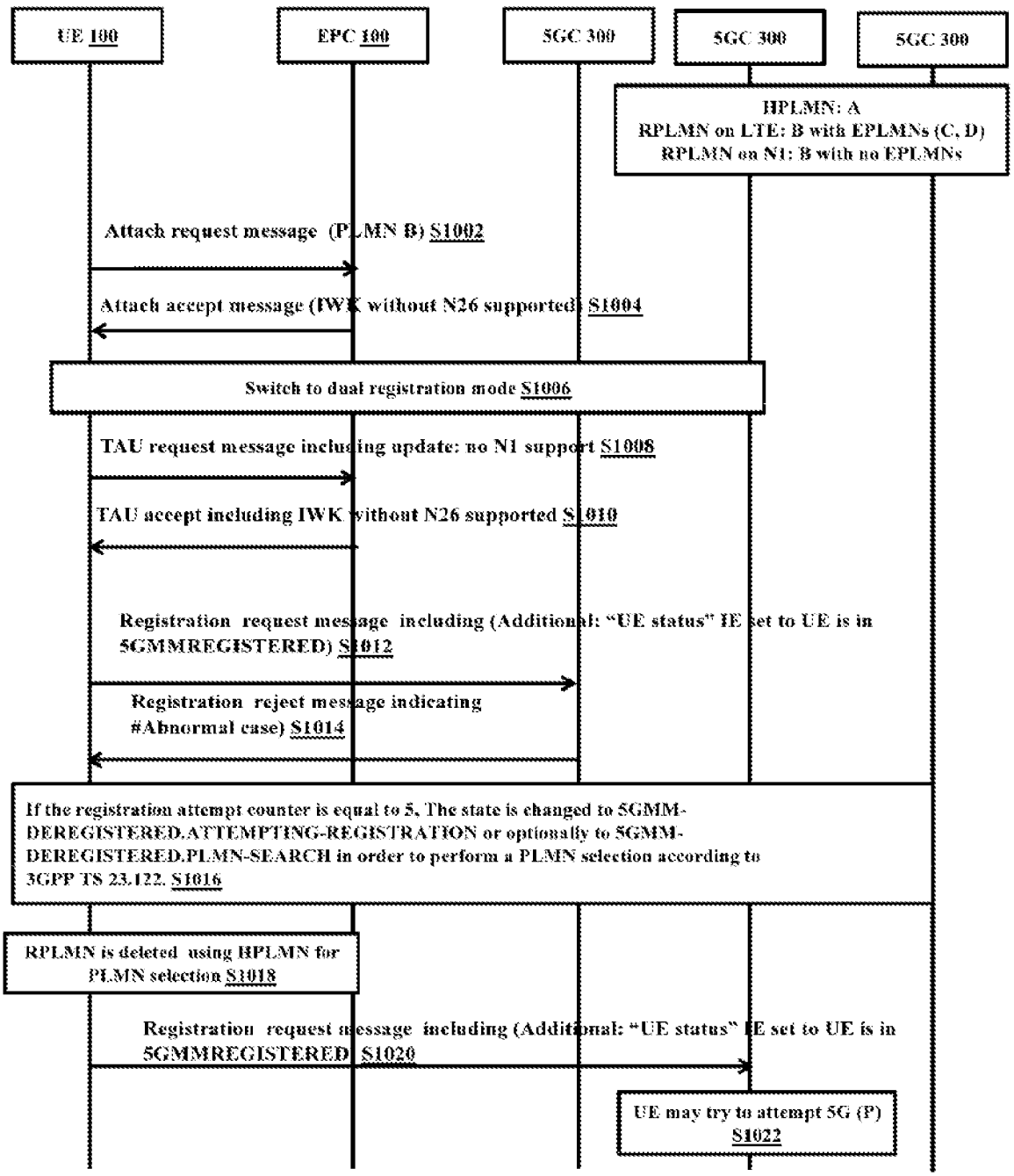
FIG. 10 is a sequential diagram of various operation performs in between the UE, the EPC, and the 5GC, where the UE registered on the LTE and receives abnormal error on N1, according to a prior art.

FIG. 10 is a sequential diagram of various operation performs in between the UE 100, the EPC 208 and the 5GC 308, where the UE 100 registered on the LTE and abnormal error on N1, according to a prior art. The UE 100 is registered to both NR and LTE with multiple PDNs operating in NR mode. The UE 100 faces abnormal case on the UE side during NR registration. As per TS 24.501, NR RPLMN and EPLMN may be deleted, and the UE 100 may follow PLMN selection as in TS 23.122. As per TS 23.122 search on HPLMN may be started and when UE 100 is not available the UE might try available PLMNs in 5G (which might be different PLMN than 4G registered PLMN), and this could lead to the UE 100 not operating in dual registration mode.

As per 3GPP TS 24.501, the UE capable of dual registration mode when attached to the network that supports the dual registration mode (Interworking without N26 supported), the PLMN selection should be limited. In dual-registration mode, if both 5GMM and EMM are enabled, the UE 100 may maintain independent contexts for 5GMM and EMM, and this includes independent lists of equivalent PLMNs. The UE 100 which is capable of N1 mode and S1 mode and is operating in the dual-registration mode. Coordination between 5GMM and EMM is not needed, except as specified in the present sub-clause C and D. According to sub-clause C, if the UE 100 is registered in the N1 mode, then for registration in S1 mode the UE 100 may use the same PLMN to which UE 100 is registered in the N1 mode or an equivalent PLMN. According to sub-clause D, if the UE 100 is registered in the S1 mode, then for registration in N1 mode UE 100 may use the same PLMN to which UE 100 is registered in S1 mode or an equivalent PLMN. If the UE 100 is registered in both N1 mode and S1 mode, then due to the UE's mobility the PLMNs to which the UE 100 is registered in N1 mode and S1 mode, respectively, can become non-equivalent PLMNs.

With the above statement, the UE 100 may limit PLMN selection to RPLMN and equivalent PLMN's that are reported by N1 mode or the S1 mode which may lead for the UE 100 not to register on S1 mode or the N1 mode. Additionally, if the network doesn't report equivalent PLMN's then even though the UE 100 and the network supports dual registration, the UE 100 might not register with the N1 mode or the S1 mode due to abnormal/incomplete equivalent PLMN list. This problem can be visible when operators use different PLMN's for NR and LTE while deploying NR.

In an example, an operator may configure an EHPLMN with different PLMN ID's for NR and LTE as below:

[I] SIM_HOME Plmn List (2)
[I] #0: 12345f, AccTech: LTE (0x1048)→Newly introduced NR HPLMN
[I] #1: 23456f, AccTech: NO_ACC_TECH_SELECTED (0x0000)→Existing LTE HPLMN With the above subscriber identification module (SIM) combination, if the UE 100 attaches to the LTE EHPLMN (e.g., 23456f) and the network supports dual registration, but LTE EHPLMN did not include a NR EHPLMN (e.g., 12345f) in an equivalent PLMN list then the UE may not be able to register on a NR RAT.

In continuation of problem statement, as per 3GPP TS 24.501 during UE mobility, UE 100 may receive a new equivalent PLMN list in NR or LTE. Due to the UE's mobility, if the UE 100 is registered in both N1 mode and S1 mode during dual-registration mode, the PLMNs to which the UE 100 is registered in N1 mode and S1 mode can become non-equivalent PLMN. The EPLMN list received in NR—A, B, C and LTE—A, B, C and the UE 100 is registered on NR and LTE in PLMN A. Due to UE mobility, the NR reselected to PLMN C, but during registration PLMN C doesn't send any equivalent PLMN list.

As shown in the FIG. 10, at S1002, the UE 100 sends the attach request message (PLMN B) to the EPC 208. At S1004, the EPC 208 sends the attach accept message including IWK without N26 supported to the UE 100. At S1006, the UE 100 switches to the dual registration mode. At S1008, the UE 100 sends the TAU request including an update of no N1 support to the EPC 208. At S110, the EPC 208 sends the TAU accept including IWK without N26 supported to the UE 100. At S1012, the UE sends the registration request message including (Additional: "UE status" IE set to UE is in 5GMMREGISTERED) to the 5GC 308b. At S1014, the 5GC 308a sends the registration reject message due to abnormal case.

At S1016, if the registration attempt counter is equal to 5, the state is changed to 5GMM-DEREGISTERED.ATTEMPTING-REGISTRATION or optionally to 5GMM-DEREGISTERED.PLMN-SEARCH to perform a PLMN selection according to 3GPP TS 23.122. At S1018, the UE 100 determines that the RPLMN is deleted using HPLMN for PLMN selection. At S1020, the UE 100 sends the registration request message including (Additional: "UE status" IE set to UE is in 5GMMREGISTERED) to the 5GC 308b. At S822, the UE 100 may try to attempt 5G (P).

Referring to the FIGS. 11 through 26, embodiments where similar reference characters denote corresponding features consistently throughout the figures are shown.

Figure 11:
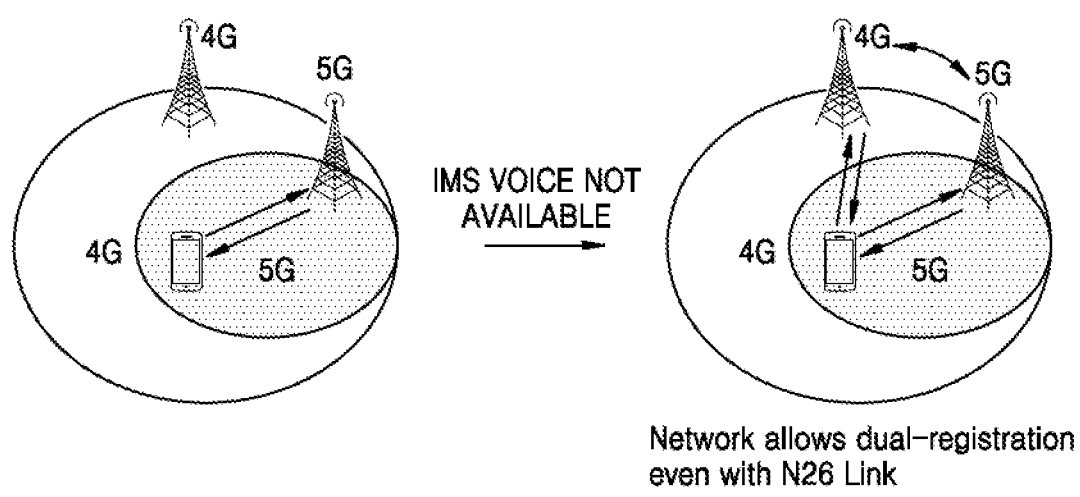
FIG. 11 is an example scenario in which the UE provides an IMS voice service while occurring change of IMS voice availability, when the UE handles a dual registration in the wireless communication system, according to the embodiments as disclosed herein.

FIG. 11 is an example scenario in which the UE 100 provides an IMS voice service in a wireless communication system 1000 while a change of IMS voice availability occurs and when the UE 100 handles a dual registration in the wireless communication system 1000, according to the embodiments as disclosed herein. In an embodiment, the wireless communication system 1000 includes the UE 100 communicated with the LTE node and 5G node.

The UE 100 can be, for example but not limited to a Unmanned Aerial Vehicle (UAV), an airplane, a cellular phone, a tablet, a smartphone, a laptop, a Personal Digital Assistant (PDA), a global positioning system, a multimedia device, a video device, an internet of things (IoT) device, a smartwatch, a game console, or the like. The UE 100 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station 200 may also be referred to as a base transceiver station, a radio base station, a radio transceiver, a transceiver function, a basic service set (BSS), an extended service set (ESS), an eNB, a gNB or the like.

The UE 100 registers on a 4G RAT and a 5G RAT, where the 4G RAT is LTE, and 5G RAT is NR. Further, the UE 100 determines an occurrence of at least one event and suspends the registration on the 5G RAT. The at least one event includes an unavailability of a Circuit Switched Fallback (CSFB) on the 4G RAT, a service loss or failure at the 4G RAT, and a mobility of the UE 100 to a 2G or 3G network. Further, the UE 100 performs communication using the registration on the 4G RAT.

In an embodiment, the UE 100 is registered on the 4G RAT and the 5G RAT by registering the UE 100 on the 5G RAT and detecting that an IMS service is unavailable on the 5G RAT. In an embodiment, the UE 100 is registered on the 4G RAT and the 5G RAT by registering the UE 100 on the 4G RAT and detecting that the IMS service is unavailable on the 4G RAT.

In another embodiment, the UE 100 may register on a first RAT. For example, the UE 100 may determine whether a common Public Land Mobile Network (PLMN) is available in a Registered Public Land Mobile Network (RPLMN) and equivalent PLMN list available with the first RAT and an RPLMN and equivalent PLMN list received from the second RAT. Additionally or alternatively, the UE 100 may determine whether an Equivalent Home PLMN (EHPLMN) is available in each of the RPLMN and equivalent PLMN list available with the first RAT and the RPLMN and equivalent PLMN list received from the second RAT.

In response to determining that the common PLMN is not available or EHPLMN is not available, the UE 100 registers on the second RAT using the RPLMN and equivalent PLMN list available with the first RAT. In response to determining that the common PLMN is available or EHPLMN is available, the UE 100 triggers or registers on the second RAT using the RPLMN and equivalent PLMN list received from the second RAT.

In an embodiment, the first RAT is a 5G RAT, and the second RAT is a 4G RAT. In another embodiment, the first RAT is a 4G RAT and the second RAT is a 5G RAT.

The UE 100 may provide CSFB call support on LTE and simultaneously provide 5G services on NR in dual registration mode irrespective of 'N26' availability as long as the UE 100 is in service in LTE. If the UE 100 switches RAT to 3G/2G or loses service on the 4G, the UE 100 may switch back to the single registration mode and recede from the 5G service. The UE 100 may ensure 5G services are available to the user as long as the UE is in 4G service and prioritize voice service over 5G service when 4G is not in service.

Figure 12:
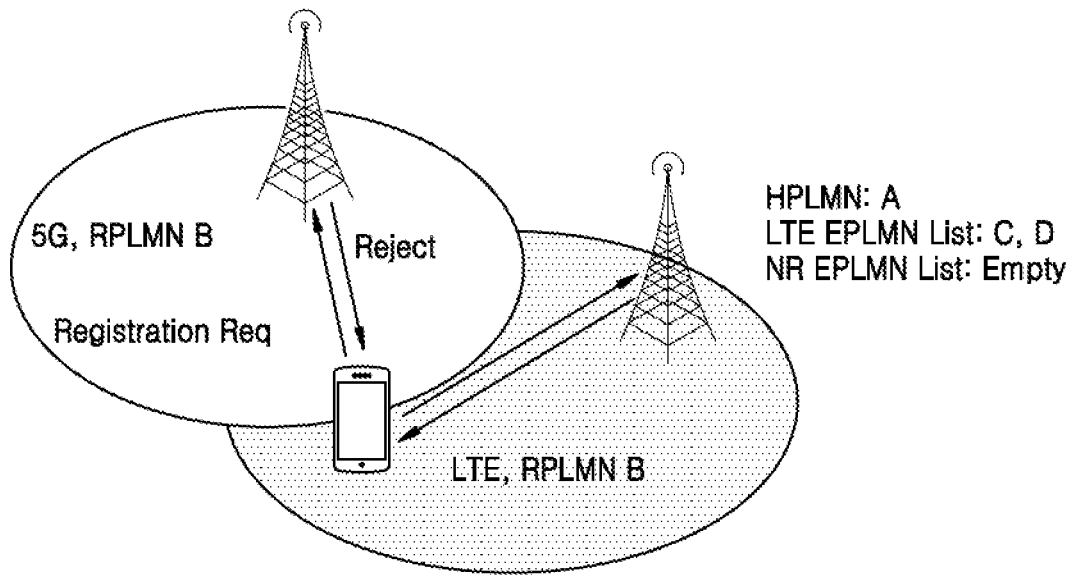
FIG. 12 is an example scenario in which the UE is registered to the LTE with multiple PDNs operating in the New Radio (NR) mode, and the UE receives #13 or #15 in NR rat, according to the embodiments as disclosed herein.

FIG. 12 is an example scenario in which the UE 100 is registered to the LTE with multiple PDNs operating in the NR mode, and the UE receives #13 or #15 in NR RAT, according to the embodiments as disclosed herein.

As shown in the FIG. 12, the UE 100 is registered to the LTE with multiple PDNs operating in the NR mode, and the UE 100 receives #13 in NR RAT or #15 NR RAT or abnormal case. Based on the present disclosure, if the UE 100 is already registered on another RAT, the UE 100 shifts PDNs to the new RAT and the UE 100 performs PLMN selection on rejected RAT using RPLMN and EPLMN of other registered RAT, so that the UE 100 makes use of RPLMN and EPLMN list of S1 mode to acquire services in 5G. (Detailed operations are explained in the FIG. 24 and FIG. 26).

Figure 13:
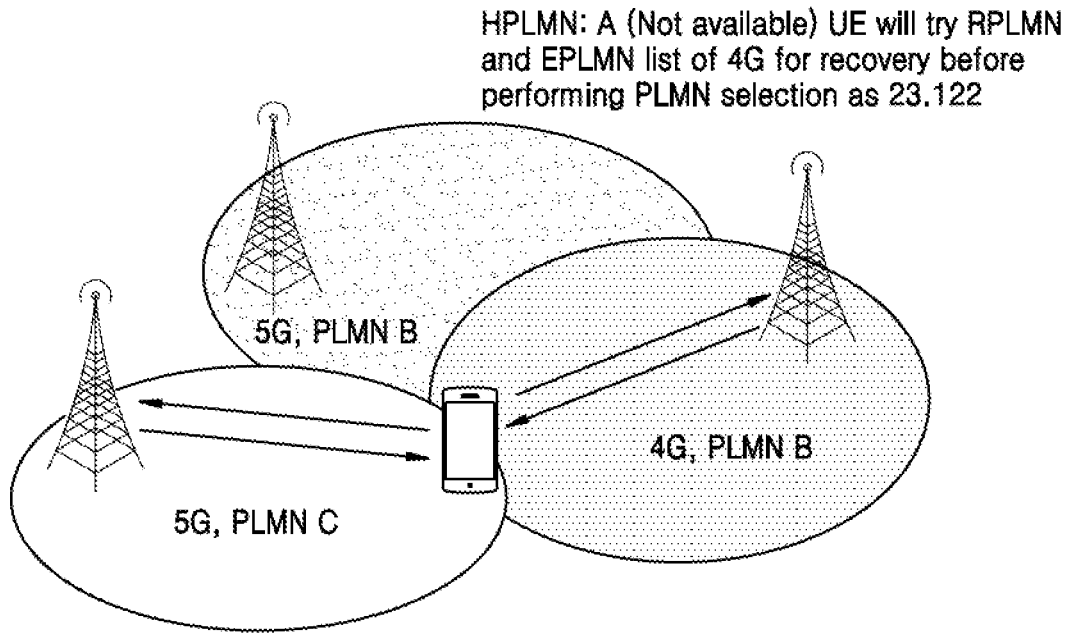
FIG. 13 is an example scenario in which the LIE is registered to the LTE with multiple PDNs operating in NR mode, and the UE receives an abnormal condition, the UE remains in no service on 5G, according to the embodiments as disclosed herein.

FIG. 13 is an example scenario in which the UE 100 is registered to the LTE with multiple PDNs operating in NR mode, and the UE 100 receives an abnormal conditions, the UE 100 remains in no service on 5G, according to the embodiments as disclosed herein.

In another embodiment, if the UE 100 is already registered on other RAT, the UE 100 shifts PDNs to the new RAT. The UE 100 finds new TAIs in RPLMN and EPLMN of rejected RAT. If no new TAI is found, the UE 100 finds new TAIs in other registered RAT's RPLMN and EPLMN, so that the UE 100 makes use of RPLMN and EPLMN list of N1+S1 mode to acquire services in 5G. See FIG. 25 for detailed explanation.

Figure 14:
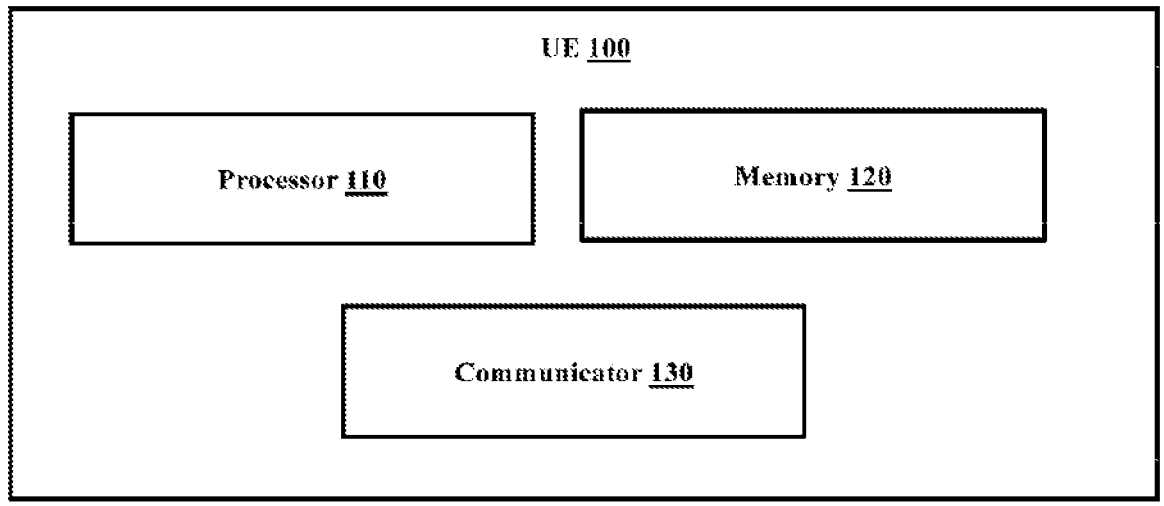
FIG. 14 illustrates various elements in the UE, according to the embodiments as disclosed herein.

FIG. 14 illustrates various elements in the UE 100, according to the embodiments as disclosed herein. The UE 100 includes a processor 110, a memory 120 and a communicator 130. The processor 110 is coupled with the memory 120 and the communicator 130.

In an embodiment, the processor 110 registers on the 4G RAT and the 5G RAT. Further, the processor 110 determines the occurrence of at least one event and suspends the registration on the 5G RAT. Further, the processor 110 performs communication using the registration on the 4G RAT.

In another embodiment, the processor 110 register on the first RAT. Further, the processor 110 determines whether the common PLMN is available in the RPLMN and equivalent PLMN list available with the first RAT and a RPLMN and equivalent PLMN list received from the second RAT, or determines whether the EHPLMN is available in each of the RPLMN and equivalent PLMN list available with the first RAT and the RPLMN and equivalent PLMN list received from the second RAT.

In response to determining that the common PLMN is not available or EHPLMN is not available, the processor 110 registers on the second RAT using the RPLMN and equivalent PLMN list available with the first RAT. In response to determining that the common PLMN is available or EHPLMN is available, the processor 110 registers on the second RAT using the RPLMN and equivalent PLMN list received from the second RAT. In response to determining that the common PLMN is available or EHPLMN is available, the processor 110 triggers the registration on the second RAT using the RPLMN and equivalent PLMN list received from the second RAT.

The processor 110 is configured to execute instructions stored in the memory 120 and to perform various processes. The communicator 130 is configured for communicating internally between internal hardware components and with external devices via one or more networks.

The memory 120 stores instructions to be executed by the processor 110. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in Random Access Memory (RAM) or cache).

Although the FIG. 14 shows various hardware components of the UE 100; it is to be understood that other embodiments are not limited thereon. In other embodiments, the UE 100 may include a number of components. Further, the labels or names of the components are used for illustrative purposes and does not limit the scope of the present disclosure. One or more components can be combined together to perform same or substantially similar function to handle the dual registration in the wireless communication system 1000.

Figure 15:
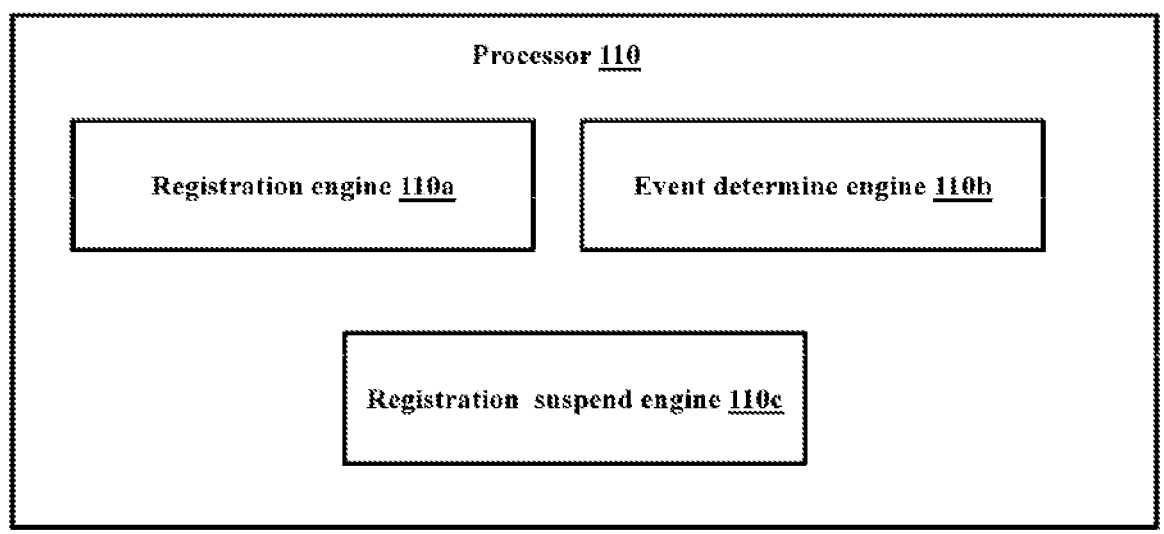
FIG. 15 illustrates various elements in a processor, according to the embodiments as disclosed herein.

FIG. 15 illustrates various elements in the processor 110, according to the embodiments as disclosed herein. In an embodiment, the processor 110 includes a registration engine 110a, an event determine engine 110b, and a registration suspend engine 110c.

In an embodiment, the registration engine 110a registers UE 100 on the 4G RAT and the 5G RAT. Further, the vent determine engine 110b determines the occurrence of at least one event. The registration suspend engine 110c suspends the UE registration on the 5G RAT. Further, the registration engine 110a performs communication using the registration on the 4G RAT.

In another embodiment, the registration engine 110a register on the first RAT. Further, the registration engine 110a determines whether the common PLMN is available in the RPLMN and equivalent PLMN list available with the first RAT and a RPLMN and equivalent PLMN list received from the second RAT, or determines whether the EHPLMN is available in each of the RPLMN and equivalent PLMN list available with the first RAT and the RPLMN and equivalent PLMN list received from the second RAT.

In response to determining that the common PLMN is not available or EHPLMN is not available, the registration engine 110a registers on the second RAT using the RPLMN and equivalent PLMN list available with the first RAT. In response to determining that the common PLMN is available or EHPLMN is available, the registration engine 110a registers on the second RAT using the RPLMN and equivalent PLMN list received from the second RAT. In response to determining that the common PLMN is available or EHPLMN is available, the registration engine 110a triggers the registration on the second RAT using the RPLMN and equivalent PLMN list received from the second RAT.

Although the FIG. 15 shows various hardware components of the processor 110; it is to be understood that other embodiments are not limited thereon. In other embodiments, the processor 110 may include a number of components. Further, the labels or names of the components are used for illustrative purposes and does not limit the scope of the present disclosure. One or more components can be combined together to perform same or substantially similar function to handle the dual registration in the wireless communication system 1000.

Figure 16:
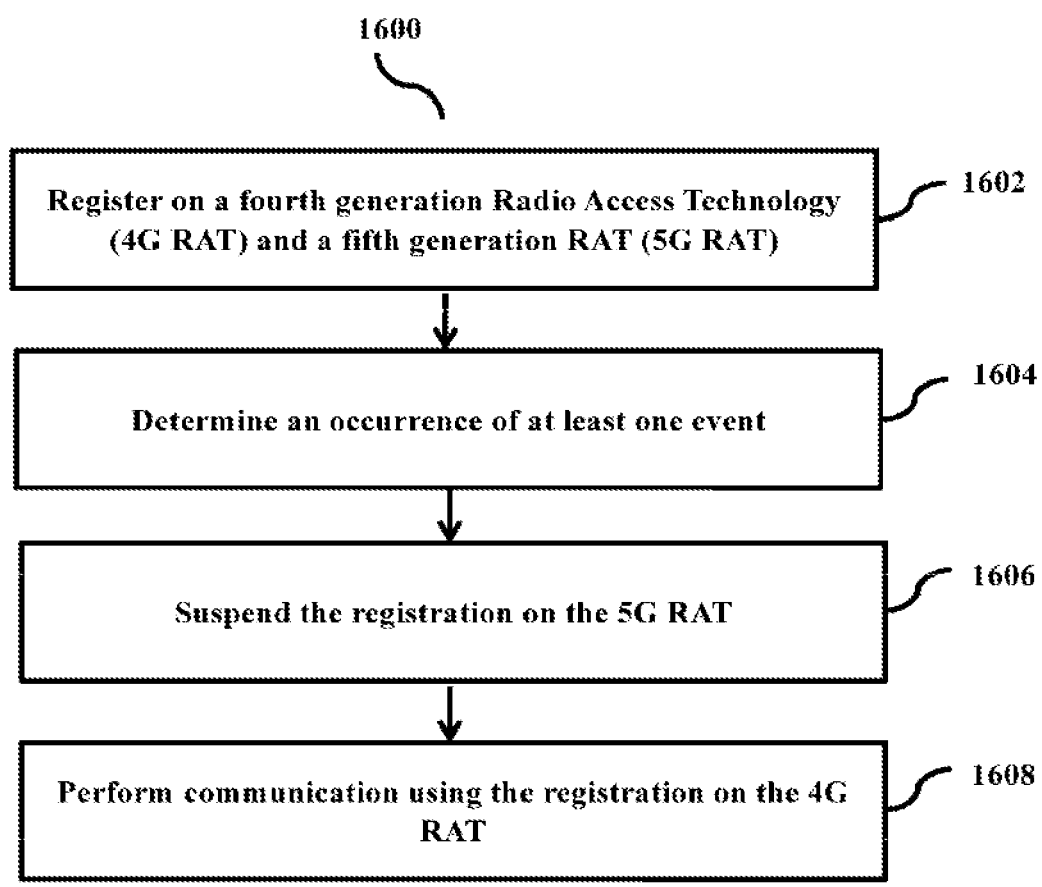
FIG. 16 is a flow chart illustrating a method for handling the dual registration in a wireless communication system, according to the embodiments as disclosed herein.

FIG. 16 is a flow chart 1600 illustrating a method for handling the dual registration in the wireless communication system 1000, according to the embodiments as disclosed herein. Operations 1602 to operation 1608 are performed by the processor 110.

At operation 1602, the method includes registering the UE on a 4G RAT and a 5G RAT. At operation 1604, the method includes determining the occurrence of at least one event. In various examples, the at least one event comprises an unavailability of a Circuit Switched Fallback (CSFB) on the first RAT, a service loss or failure at the first RAT, and a mobility of the UE to a legacy network, wherein the legacy network comprises a second generation (2G) network or third generation (3G) network At operation 1606, the method includes suspending the registration on the 5G RAT. At operation 1608, the method includes performing communication using the registration on the 4G RAT.

Additionally or alternatively, a method of wireless communication comprises registering the UE on a first RAT and a second RAT different from the first RAT, wherein the registering comprises a dual-registration on the first RAT and the second RAT; identifying at least one condition from a list comprising: an unavailability of a CSFB on the first RAT, a service loss or failure at the first RAT, and a mobility of the UE to a 2G network or 3G network; suspending the registration on the second RAT based on the at least one condition; and communicating using the first RAT based at least in part on suspending the registration on the second RAT.

Figure 17:
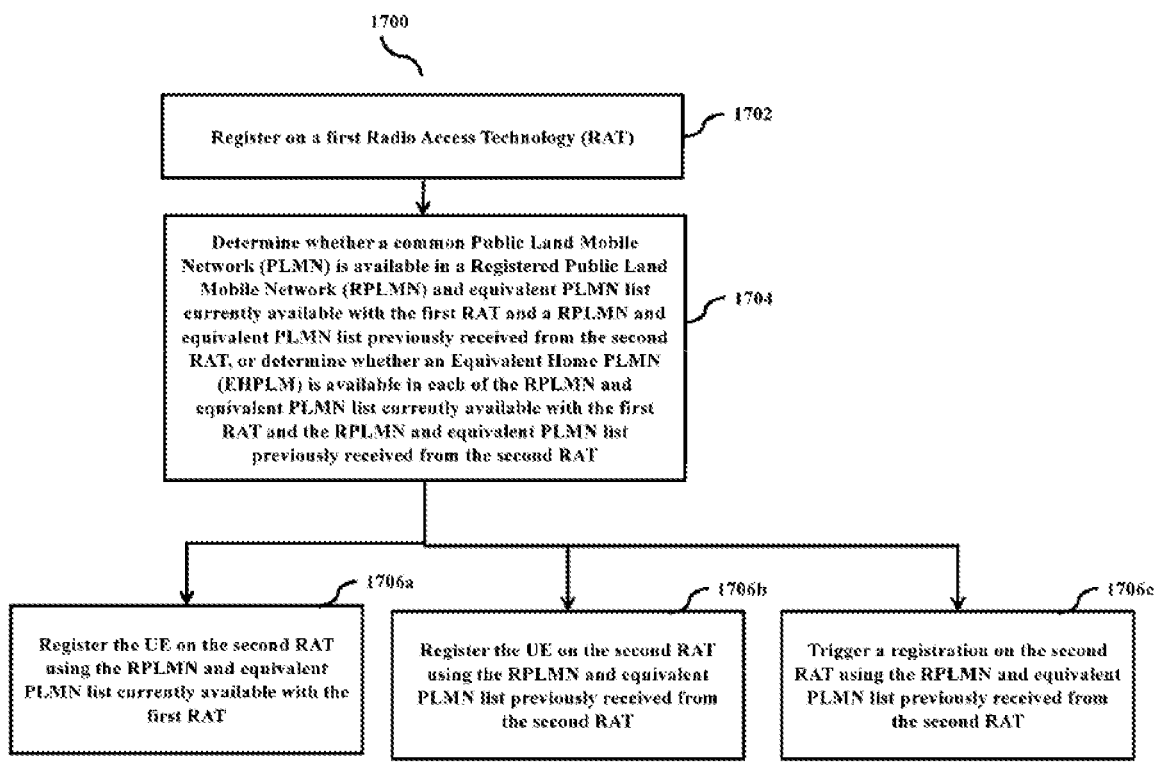
FIG. 17 is a flow chart illustrating a method for handling the dual registration in the wireless communication system, according to the embodiments as disclosed herein.

FIG. 17 is a flow chart 1700 illustrating a method for handling the dual registration in the wireless communication system 1000, according to the embodiments as disclosed herein. The operations 1702 to 1706c are performed by the processor 110.

At operation 1702, the method includes registering on the first RAT. At operation 1704, the method includes determining whether a common PLMN is available in a RPLMN and equivalent PLMN list available with the first RAT and a RPLMN and equivalent PLMN list received from the second RAT, or determining whether an EHPLMN is available in each of the RPLMN and equivalent PLMN list available with the first RAT and the RPLMN and equivalent PLMN list received from the second RAT. In response to determining that the common PLMN is not available or EHPLMN is not available, at operation 1706a, the method includes registering the UE on the second RAT using the RPLMN and equivalent PLMN list available with the first RAT. In response to determining that the common PLMN is available or EHPLMN is available, at operation 1706b, registration of the UE on the second RAT using the RPLMN and equivalent PLMN list received from the second RAT occurs. At operation 1706c, the method includes triggering the registration on the second RAT using the RPLMN and equivalent PLMN list received from the second RAT in response to determining that the common PLMN is available or EHPLMN is available.

Figure 18:
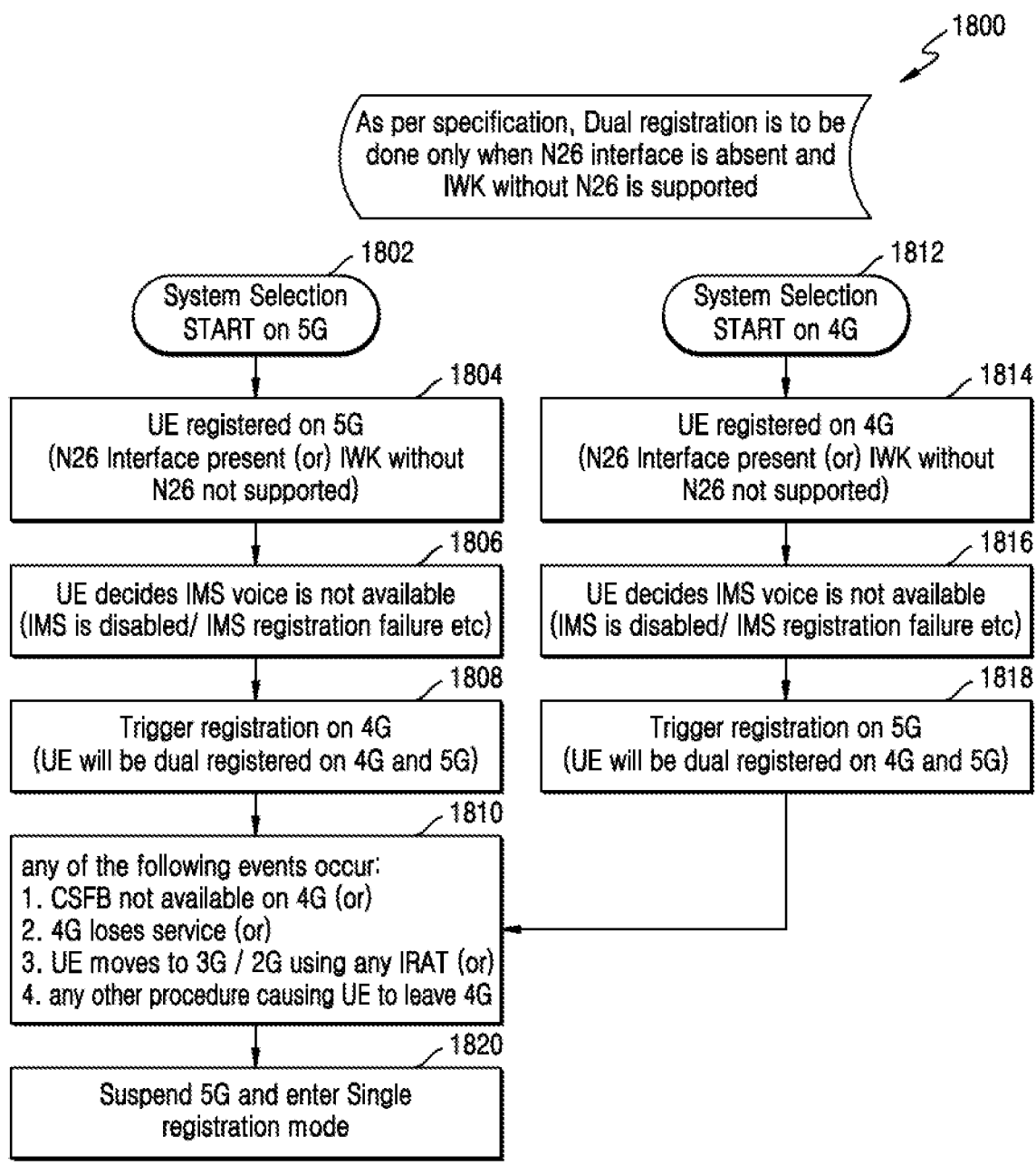
FIG. 18 is an example flow chart illustrating various operations for handling the dual registration in the wireless communication system, according to the embodiments as disclosed herein.

FIG. 18 is an example flow chart 1800 illustrating various operations for handling the dual registration in the wireless communication system 1000, according to the embodiments as disclosed herein.

At 1802, the system selection starts on 5G. At operation 1804, the UE 100 is registered on 5G (N26 Interface present (or) IWK without N26 not supported). At operation 1806, the UE 100 decides IMS voice is not available (i.e., IMS is disabled/IMS registration failure, etc.). At 1808, the UE 100 triggers registration on 4G (i.e., the UE 100 may be dual registered on 4G and 5G). At operation 1810, CSFB may not be available on 4G (or), 4G loses service, the UE moves to 3G/2G using any IRAT, or any other procedure causing UE to leave 4G may occur. At operation 1820, the UE 100 suspends the 5G and enters the single registration mode.

At operation 1812, the system selection starts on the 4G. At operation 1814, the UE 100 registered on 4G (N26 Interface present (or) IWK without N26 not supported). At operation 1816, the UE 100 decides IMS voice is not available. AT 1818, the UE 100 triggers registration on the 5G (i.e., the UE 100 may be dual registered on 4G and 5G).

At operation 1810, the CSFB not available on 4G, 4G loses service, UE moves to 3G/2G using any IRAT, or any other procedure causing UE to leave 4G may occur. At operation 1820, the UE 100 suspends the 5G and enters the single registration mode.

Figure 19:
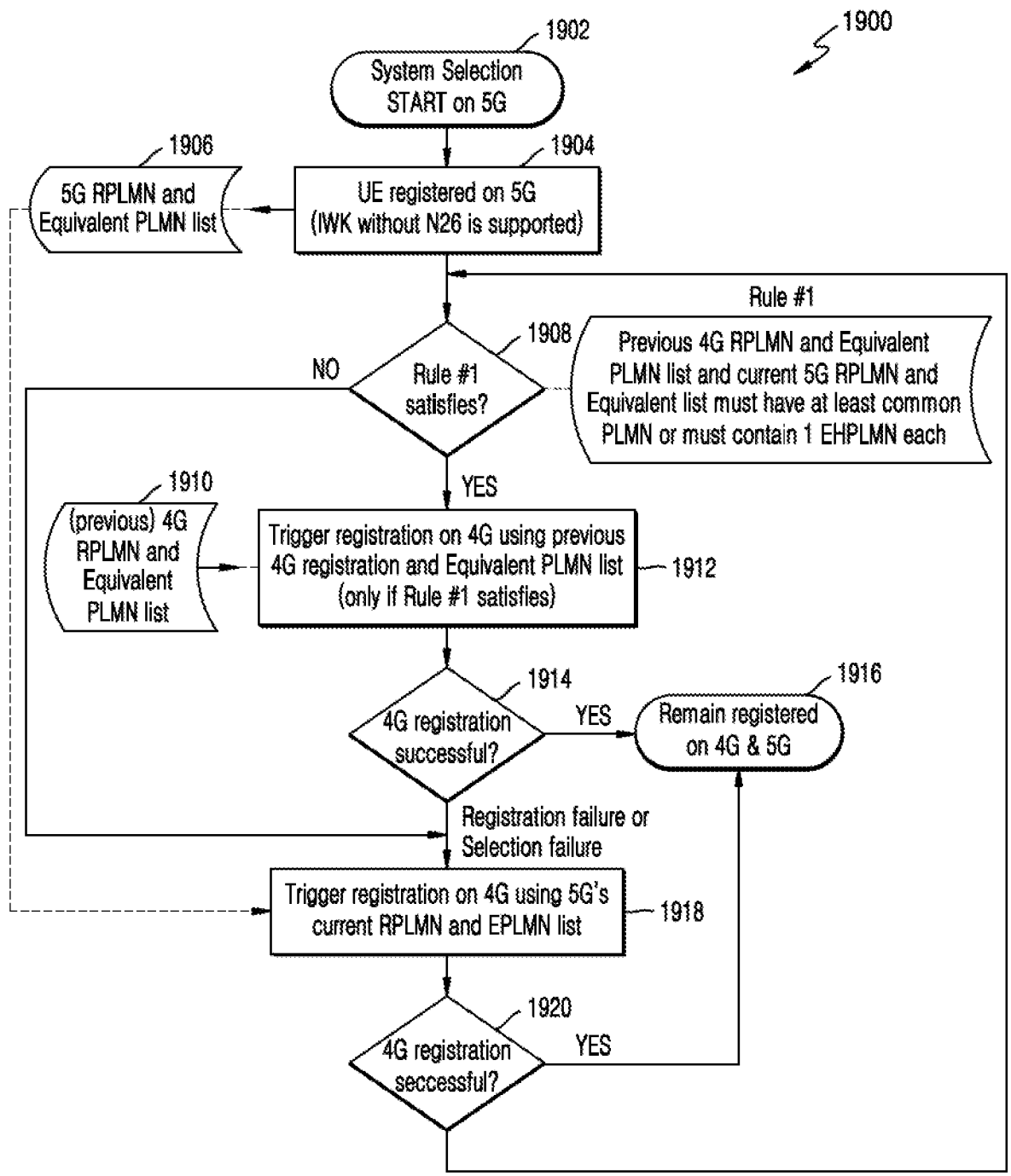
FIG. 19 and FIG. 20 are example flow charts illustrating various operations for handling the dual registration in the wireless communication system during the PLMN selection in the dual registration, according to the embodiments as disclosed herein.
Figure 20:
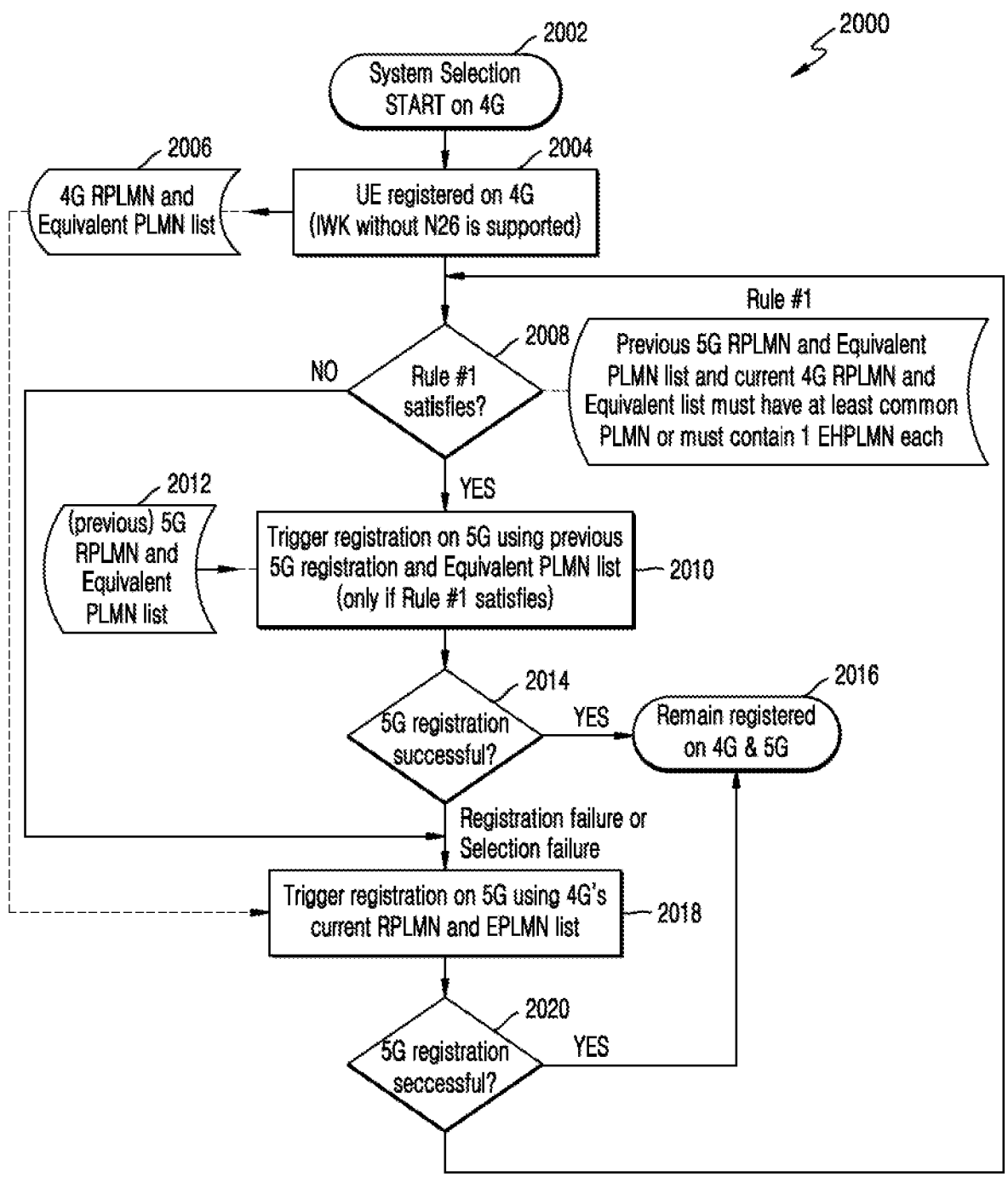

FIG. 19 and FIG. 20 are example flow charts 1900 and flow chart 2000. Flow charts 1900 and flow chart 2000 illustrate various operations for handling the dual registration in the wireless communication system 1000 during the PLMN selection in the dual registration, according to the embodiments as disclosed herein.

As shown in the FIG. 19, at operation 1902, the system selection starts on the 5G. At operation 1904, the UE 100 is registered on 5G (IWK without N26 is supported). At operation 1906, the UE 100 receives the 5G RPLMN and Equivalent PLMN list. At operation 1908, the UE 100 determines that previous 4G RPLMN and an equivalent PLMN list. Additionally, operation 1908 determines whether a current 5G RPLMN and an equivalent list have at least a common PLMN or contain at least 1 EHPLMN, until each is satisfied.

A previous 4G RPLMN and equivalent PLMN list and current 5G RPLMN and equivalent list may have at least common PLMN or may contain at least 1 EHPLMN each is satisfied at operation 1912; the UE 100 triggers the registration on 4G using previous 4G registration and Equivalent PLMN list received at operation 1910. At operation 1914, the UE 100 determines that 4G registration is successful? If 4G registration is successful then, at operation 1916, the UE 100 remains registered on 4G and 5G. If 4G registration is not successful then, at operation 1918, the UE 100 trigger registration on 4G using 5G s current RPLMN and EPLMN list. At operation 1920, the UE 100 again determines that 4G registration is successful? If 4G registration is successful then, at 1916, the UE 100 remains registered on 4G and 5G. If 4G registration is not successful then, at operation 1918, the UE 100 determines that previous 4G RPLMN and equivalent PLMN list and current 5G RPLMN and equivalent list may have at least common PLMN or may contain at least 1 EHPLMN each.

As shown in the FIG. 20, at operation 2002, the system selection start on 4G. At operation 2004, the UE 100 is registered on 4G (IWK without N26 is supported). At operation 2006, the UE 100 receives 4G RPLMN and equivalent PLMN list. At operation 2008, the UE 100 determines that previous 5G RPLMN and Equivalent PLMN list and current 4G RPLMN and Equivalent list may have at least common PLMN or may contain at least 1 EHPLMN each. If the previous 5G RPLMN and Equivalent PLMN list and current 4G RPLMN and Equivalent list may have at least common PLMN or may contain at least 1 EHPLMN each then at operation 2010, the UE 100 triggers the registration on 5G using previous 5G registration and Equivalent PLMN list received at operation 2012. At operation 2014, the UE 100 determines that 5G registration is successful? If 5G registration is successful, at operation 2016, the UE 100 remains registered on 4G and 5G. If 5G registration is not successful then, at operation 2018, the UE 100 triggers the registration on 5G using 4G s current RPLMN and EPLMN list. At operation 2020, the UE 100 determines that 5G registration is successful? If 5G registration is successful, at 2016, the UE 100 remains registered on 4G and 5G. If 5G registration is not successful then, at operation 2018, the UE 100 determines that previous 5G RPLMN and Equivalent PLMN list and current 4G RPLMN and Equivalent list may have at least common PLMN or may contain at least 1 EHPLMN each.

Figure 21:
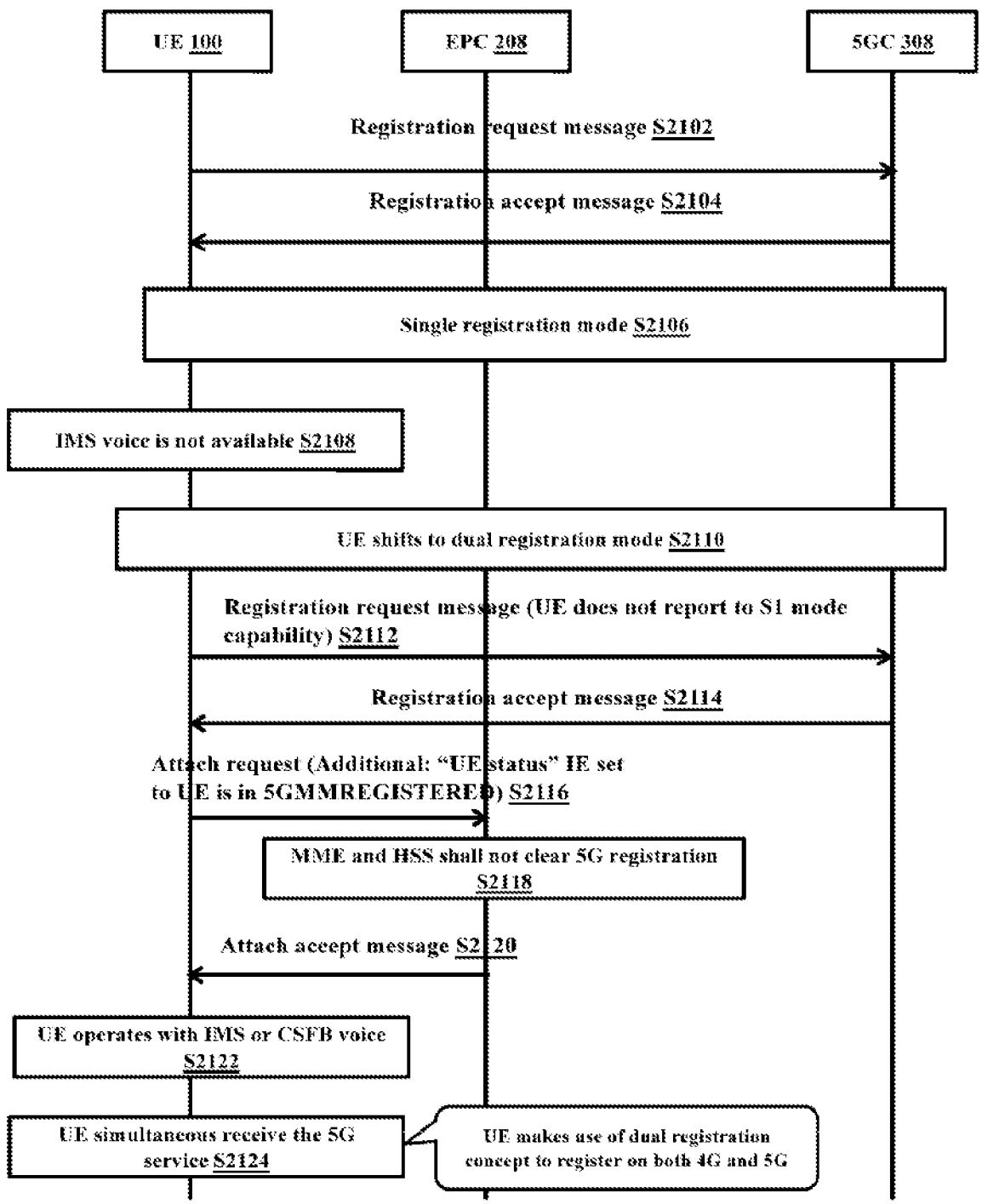
FIG. 21 is an example sequence diagram illustrating the dual registration with N26 support, according to the embodiments as disclosed herein.

FIG. 21 is an example sequence diagram illustrating the dual registration with N26 support, according to the embodiments as disclosed herein. Operation in dual registration mode is fully dependent on UE's implementation. The UE may not rely on "IWK N26" support from network, interface information in REGISTRATION ACCEPT message to decide to operate in dual registration mode. UE might operate in dual registration mode even when 'N26' interface is supported, to provide 5G services to the user. The UE may not rely on IMS voice availability to enable or disable N1 mode. UE may not disable N1 mode when IMS is disabled or IMS voice is not available. UE can use various information like previous registration info, number of subscribed NS-SAIs available in the SIM card, etc. to determine to switch to dual registration mode. Network may make use of "UE status" IE in "REGISTRATION_REQUEST" message to not clear the EMM registration context.

The UE 100 may provide CSFB call support on LTE and simultaneously provide 5G services on NR in dual registration mode irrespective of 'N26' availability if UE is in service in LTE. If UE switches RAT to 3G/2G or loses service on 4G, UE may switch back to Single registration mode and recede from 5G service. UE may ensure 5G services are available to the user as long as UE is in 4G service and prioritize voice service over LTE service.

At S2102, the UE 100 sends the registration request message to the 5GC 308. At S2104, the 5GC 308 sends the registration accept message to the UE 100. At S2106, the UE 100 is in a single registration mode. At S2108, UE 100 detects that IMS voice is not available. At S2110, the UE 100 shifts to the dual registration mode. At S2112, the UE 100 sends the registration request message to the 5GC 208. The UE does not report to S1 mode capability. At S2114, the 5GC 208 sends the registration accept message to the UE 100. At S2116, the UE 100 sends the attach request (including additional: "UE status" IE set to UE is in 5GMMREGISTERED) to the EPC 208. At S2118, the Mobility Management Entity (MME) and the Home Subscriber Server (HSS) may not clear 5G registration. At S2120, the EPC 208 sends an attached accept message to the UE 100. At S2122, the UE 100 operates with IMS or CSFB voice. At S2124, the UE 100 simultaneous receive the 5G service.

Figure 22:
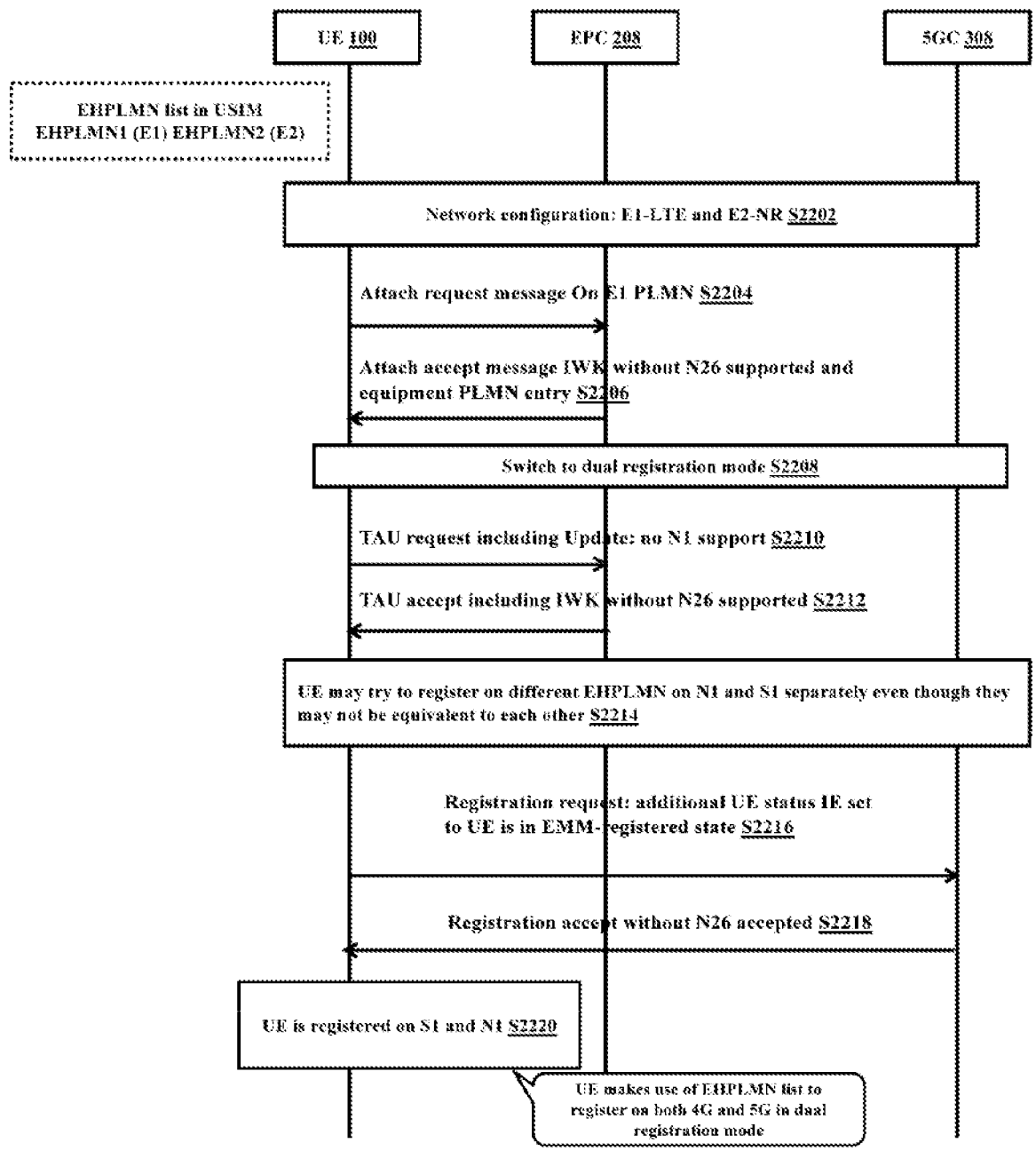
FIG. 22 is an example sequence diagram illustrating PLMN selection in the dual registration, according to the embodiments as disclosed herein.

FIG. 22 is an example sequence diagram illustrating PLMN selection in dual registration, according to the embodiments as disclosed herein.

At S2202, consider the network configuration is E1-LTE and E2-NR. At S2204, the UE 100 sends the attach request message on E1 PLMN to the EPC 208. At S2206, the EPC 208 sends the attach accept message including IWK without N26 supported and equipment PLMN entry to the UE 100. AT S2208, the UE 100 switches to the dual registration mode. At S2210, the UE 100 sends the TAU request including an update stating no N1 support to the EPC 208. At S2212, the EPC 208 sends the TAU accept including IWK without N26 supported to the UE 100. At S2214, the UE 100 may register on different EHPLMN on N1 and S1 separately even though N1 and S1 may not be equivalent to each other. At S2216, the UE 100 sends the registration request including additional UE status IE set to UE is in EMM-registered state to the 5GC 308. At S2218, the 5GC 308 sends the registration accept without N26 accepted to the UE 100. At S2220, the UE 100 is registered on S1 and N1. Further, the UE 100 makes use of EHPLMN list to register on both 4G and 5G in dual registration mode.

Figure 23:
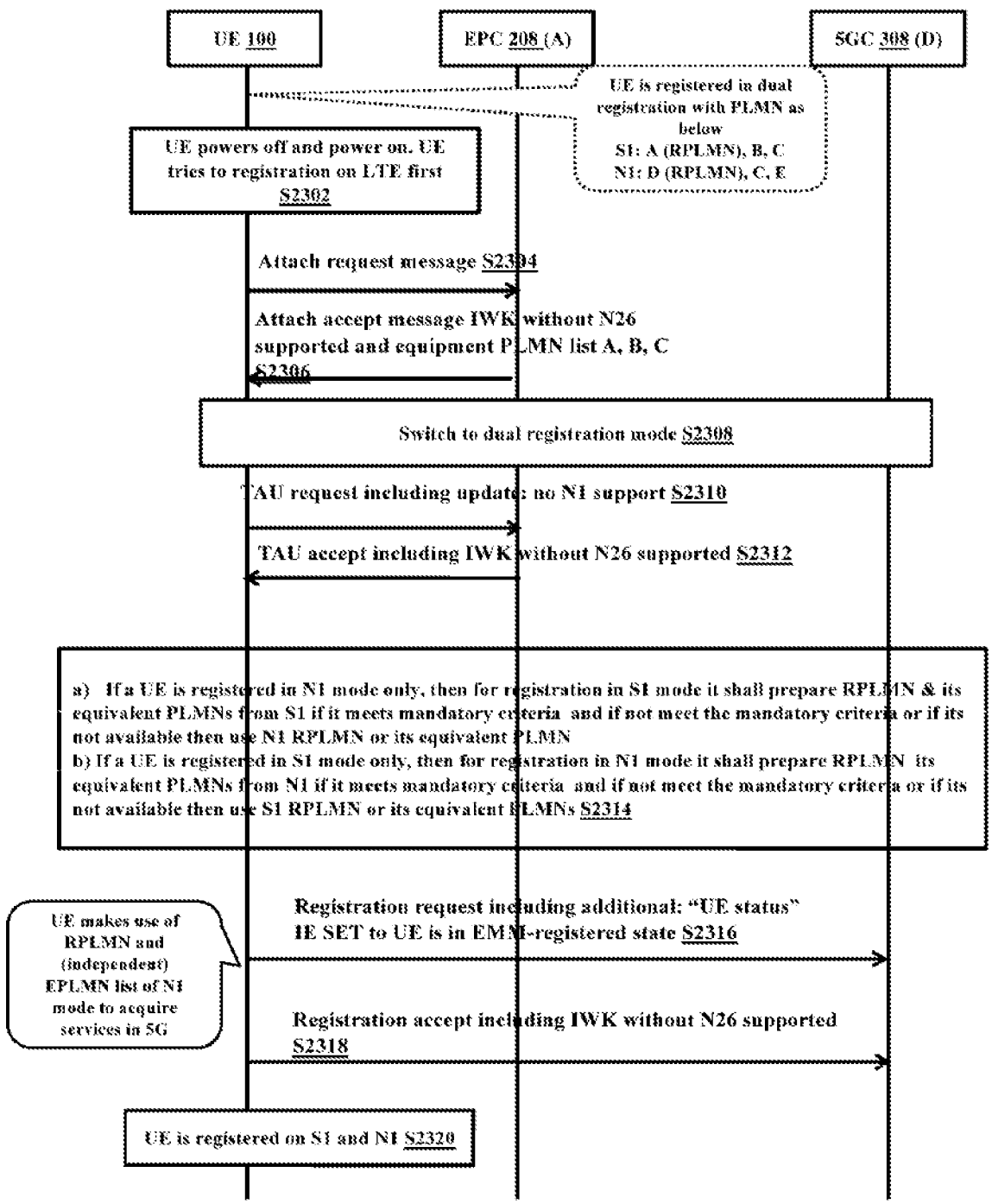
FIG. 23 is an example sequence diagram illustrating PLMN selection in dual registration during power off/on condition, according to the embodiments as disclosed herein.

FIG. 23 is an example sequence diagram illustrating PLMN selection in dual registration during power off/on condition, according to the embodiments as disclosed herein.

In dual-registration mode, both 5GMM and EMM are enabled. A UE, which is capable of N1 mode and S1 mode and is operating in the dual-registration mode may maintain independent contexts registrations for 5GMM and EMM independently, and this includes independent lists of equivalent PLMNs.

Even though EPLMNs lists are different, there should be at least 1 element of RPLMN/EPLMN common between both S1 and N1 EPLMN lists. (this is to ensure UE is operating on same network in S1 mode and N1 mode)

As an exception, if there is no common element, if one of S1s RPLMN/EPLMN and one of N1s RPLMN/EPLMN belong to EHPLMN list, then UE can register on 4G and NR and remain in dual registration mode.

Coordination between 5GMM and EMM is not used, except as specified in the present sub-clause c and d. According to sub-clause c, if a UE is registered in N1 mode, then for registration in S1 mode, the UE may use RPLMN and an equivalent PLMNs from S1 if the UE 100 meets certain criteria. If the UE 100 does not meet the certain criteria or if meeting the criteria is not available, then the N1 RPLMN or an equivalent PLMNs is used. According to sub-clause c, if a UE 100 is registered in S1 mode, then for registration in N1 mode the UE 100 may use RPLMN and equivalent PLMNs from N1 if the UE 100 meets certain criteria. If the UE 100 does not meet certain criteria or if certain criteria is not available, then use the S1 RPLMN or an equivalent PLMNs. UE may try to register on different EHPLMNs on N1 and S1 separately even though N1 and S1 may not be equivalent to each other.

Consider, the UE 100 is registered in dual registration with PLMN as S1: A (RPLMN), B, C, N1: D (RPLMN), C, E and the UE 100 is allowed to maintain separate EPLMN lists on N1 and S1 mode.

At 2302, the UE 100 powers off and power on and the UE 100 tries to registration on the LTE first. At S2304, the UE 100 sends the attach request message to the EPC 208. At S2306, the EPC 208 sends the attach accept message including IWK without N26 supported and equipment PLMN list to the UE 100. At S2308, the UE 100 switches to the dual registration mode. At S2310, the UE 100 sends the TAU request including an update stating no N1 support to the EPC 208. At S2312, the EPC 208 sends the TAU accept including IWK without N26 supported to the UE 100. At S2314, if the UE 100 is registered in N1 mode, then for registration in S1 mode the UE 100 may prepare RPLMN and an equivalent PLMNs from S1 meeting certain criteria. If the UE 100 does not meet the certain criteria or if it's not available, then use N1 RPLMN or its equivalent PLMN. If the UE 100 is registered in S1 mode, then for registration in N1 mode the UE 100 may prepare RPLMN an equivalent PLMNs from N1 if the UE 100 meets certain criteria. If the UE 100 does not meet certain criteria or if UE 100 does not available then use S1 RPLMN or an equivalent PLMNs.

At S2316, UE 100 sends the registration request including additional: "UE status" IE SET to UE is in EMM-registered state to the 5GC 308. At S2318, the 5GC 308 sends the registration accept including IWK without N26 supported to the UE 100. At S2320, the UE 100 is registered on S1 and N1.

Figure 24:
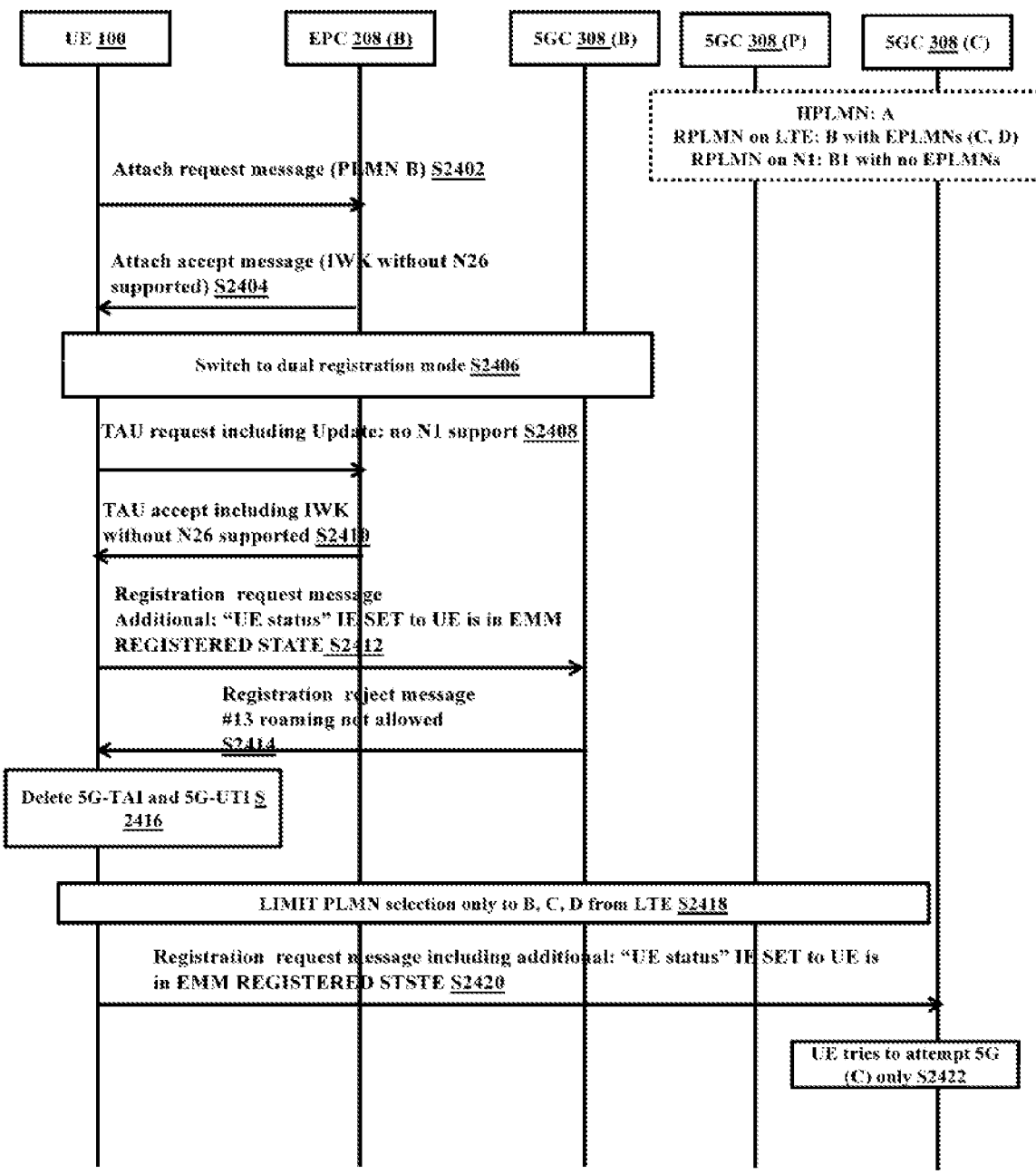
FIG. 24 is an example sequence diagram illustrating UE registered on LTE and #13 rejection on N1 scenario, according to the embodiments as disclosed herein.

FIG. 24 is an example sequence diagram illustrating a UE registered on an LTE and a #13 rejection on N1 scenario, according to the embodiments as disclosed herein.

At S2402, the UE 100 sends the attach request message (PLMN B) to the EPC 208. At S2404, the EPC 208 sends the attach accept message including IWK without N26 supported to the UE 100. At S2406, the UE 100 switches to the dual registration mode. At S2408, the UE 100 sends the TAU request including an update stating no N1 support to the EPC 208. At S2410, the EPC 208 sends the TAU accept including IWK without N26 supported to the UE 100. At S2412, the UE sends the registration request message including (Additional: "UE status" IE set to UE is in 5GMMREGISTERED) to the 5GC 308b. At S2414, the 5GC 308a sends the registration reject message due to #13 (Roaming not allowed in this tracking area). At S2416, the UE 100 deletes 5G-TAI and 5G-UTI. At S2418, the UE 100 limits PLMN selection to B, C, D from LTE. At S2420, the UE 100 sends the registration request message including (Additional: "UE status" IE set to UE is in 5GMMREGISTERED) to the 5GC 308b. At S2422, the UE 100 may try to attempt 5G (C).

Figure 25:
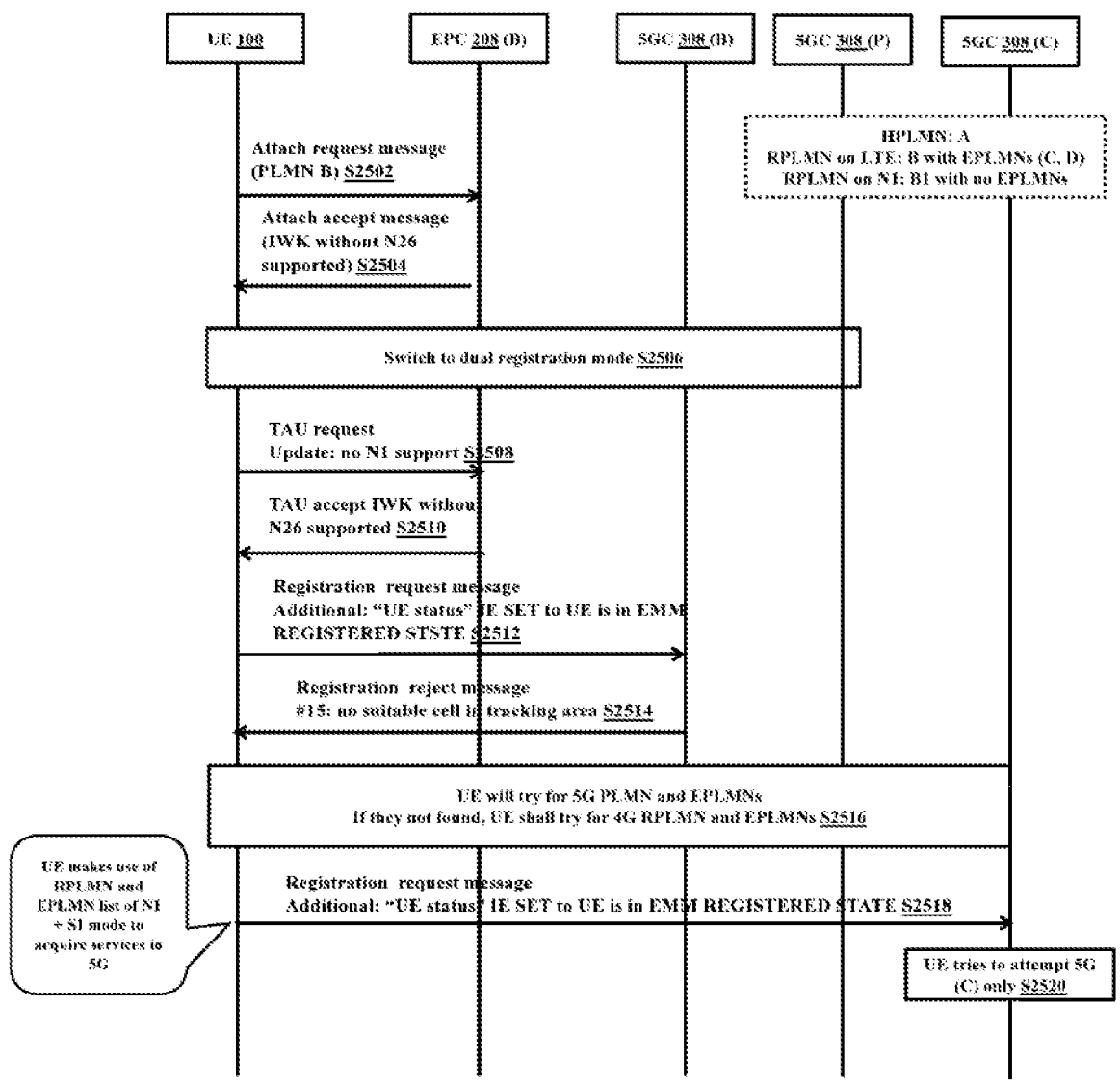
FIG. 25 is an example sequence diagram illustrating the UE registered on LTE and #15 rejection on N1 scenario, according to the embodiments as disclosed herein.

FIG. 25 is an example sequence diagram illustrating the UE registered on LTE and #15 reject on N1 scenario, according to the embodiments as disclosed herein.

At S2502, the UE 100 sends the attach request message (PLMN B) to the EPC 208. At S2504, the EPC 208 sends the attach accept message including IWK without N26 supported to the UE 100. At S2506, the UE 100 switches to the dual registration mode. At S2508, the UE 100 sends the TAU request including an update stating no N1 support to the EPC 208. At S2510, the EPC 208 sends the TAU accept including IWK without N26 supported to the UE 100. At S2512, the UE 100 sends the registration request message including (Additional: "UE status" IE set to UE is in 5GMMREGISTERED) to the 5GC 308b. At S2514, the 5GC 308a sends the registration reject message due to #15 (no suitable cells in tracking area). At S2516, the UE 100 may try to connect to 5G PLMN and EPLMNs. If 5G PLMN and EPLMNs not found, the UE 100 may try for 4G RPLMN and EPLMNs. At S2518, the UE 100 sends the registration request message including (Additional: "UE status" IE set to UE is in 5GMMREGISTERED) to the 5GC 308b. At S2422, the UE 100 may try to attempt 5G (C).

Figure 26:
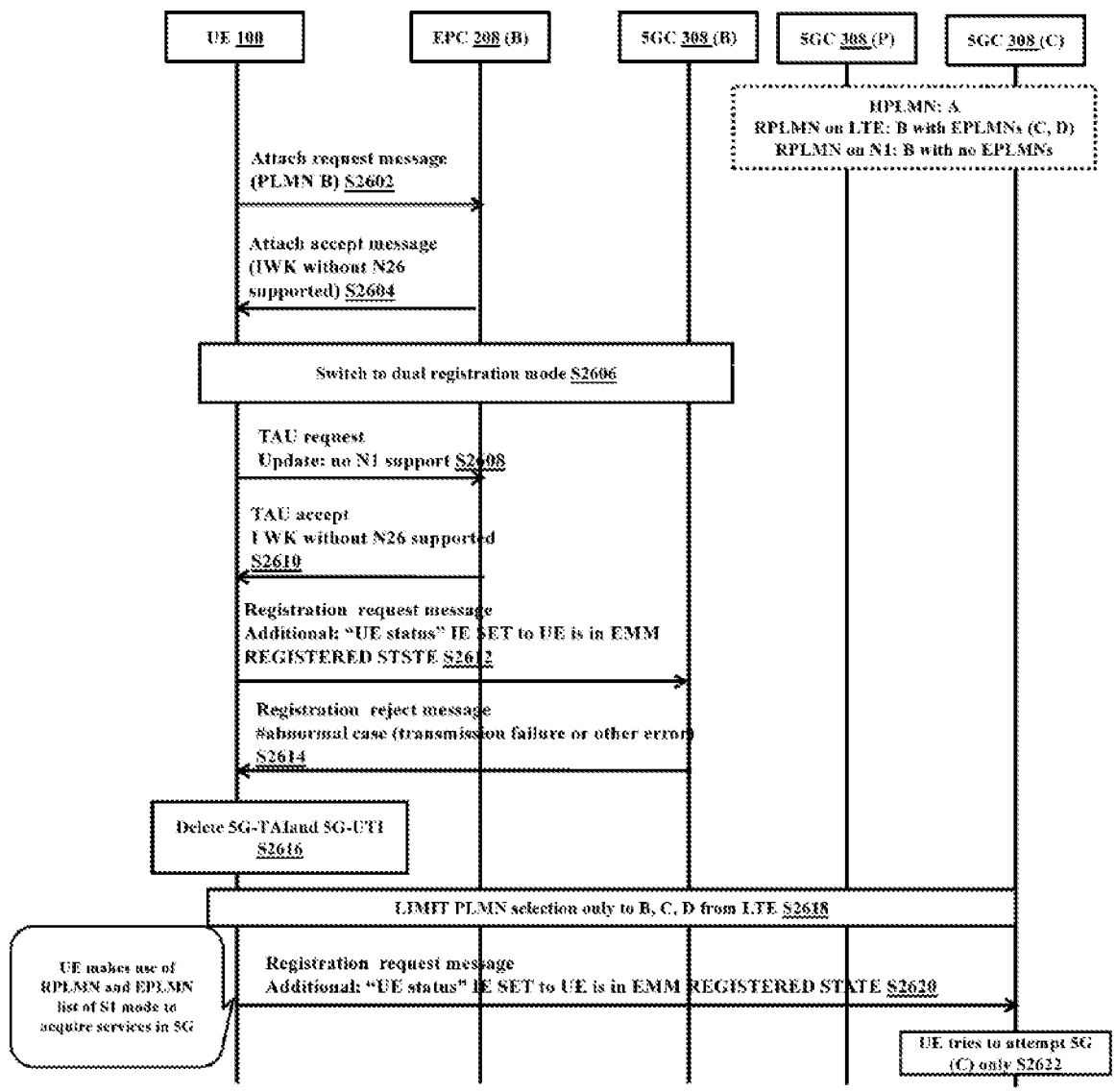
FIG. 26 is an example sequence diagram illustrating the UE registered on LTE and abnormal error on N1 scenario, according to the embodiments as disclosed herein.

FIG. 26 is an example sequence diagram illustrating the UE registered on LTE and abnormal error on N1 scenario, according to the embodiments as disclosed herein.

Upon reception of reject in N1 mode and operating in dual registration mode, UE may perform actions selectively based on LTE registration. The solution for discussed problem 2 is given in Table 2.

TABLE 2

| Rejected on NR | 3GPP behavior | Disclosed behavior |
| --- | --- | --- |
| #13 (Roaming area not allowed) | The UE may store the current TAI in the list of "5GS forbidden tracking areas for roaming" and enter the state 5GMM-DEREGISTERED.LIMITED- | If already registered on another RAT, shift PDNs to the new RAT. Perform PLMN selection on rejected RAT using RPLMN and |

TABLE 2-continued

| Rejected on NR | 3GPP behavior | Disclosed behavior |
| --- | --- | --- |
| | SERVICE or optionally 5GMM-DEREGISTERED.PLMN-SEARCH. The UE may perform a PLMN selection according to 3GPP TS 23.122 | EPLMN of other registered RAT following same steps as explained in the FIG. 24 |
| #15 (No Suitable Cells in this TA) | The UE may store the current TAI in the list of "5GS forbidden tracking areas for roaming" and enter the state 5GMM-DEREGISTERED.LIMITED-SERVICE. The UE may search for a suitable cell in another tracking area, according to 3GPP TS 38.304 [15]. | If already registered on another RAT, shift PDNs to the new RAT. Find new TAIs in RPLMN and EPLMN of rejected RAT. If no new TAI is found in point 2, then find new TAIs in other registered RAT's RPLMN and EPLMN list following same steps as explained in the FIG. 25 |
| Abnormal | If the registration attempt counter is equal to 5. The state is changed to 5GMM-DEREGISTERED.ATTEMPTING-REGISTRATION or optionally to 5GMM-DEREGISTERED.PLMN-SEARCH to perform a PLMN selection according to 3GPP TS 23.122 | If already registered on another RAT, shift PDNs to the new RAT. Perform PLMN selection on rejected RAT using RPLMN and EPLMN of other registered RAT following same steps as explained in the FIG. 26 |

When equivalent PLMN lists are different between NR and LTE in dual registration mode, then if the NR RPLMN and the LTE RPLMN are EHPLMN's then the UE 100 may stay in dual registration. Otherwise, the UE 100 may perform operations disclosed in the FIG. 8. If both NR EPLMN list and LTE EPLMN lists contain any common EPLMN, then stay in dual registration else (Handled in operations disclosed in the FIG. 8). Additionally based on UPLMN/OPLMN list priority in SIM and voice domain preference setting of the UE, UE can stay on highest priority PLMN registered RAT and suspend other RAT and move to Single Registration mode else if both NR RPLMN and LTE RPLMN are random PLMN's then for voice-centric device if NR supports IMS then remain on NR and suspend LTE else if LTE supports IMS then remain on LTE and suspend NR else suspend both NR and LTE and trigger PLMN selection as per 23.122.

At S2602, the UE 100 sends the attach request message (PLMN B) to the EPC 208. At S2604, the EPC 208 sends the attach accept message including IWK without N26 supported to the UE 100. At S2606, the UE 100 switches to the dual registration mode. At S2608, the UE 100 sends the TAU request including an update stating no N1 support to the EPC 208. At S2610, the EPC 208 sends the TAU accept including IWK without N26 supported to the UE 100. At S2612, the UE sends the registration request message including (Additional: "UE status" IE set to UE is in 5GMMREGISTERED) to the 5GC 308b. At S2614, the 5GC 308a sends the registration reject message due to #13 (Roaming not allowed in this tracking area). At S2616, the UE 100 deletes 5G-TAI and 5G-UTI. At S2418, the UE 100 limits PLMN selection to B, C, D from LTE. At S2620, the UE 100 sends the registration request message including (Additional: "UE status" IE set to UE is in 5GMMREGISTERED) to the 5GC 308b. At S2622, the UE 100 may try to attempt 5G (C).

The various actions, acts, blocks, steps, or the like in the flow chart 1600 through flow chart 2000 may be performed in the order presented, in a different order or simultaneously. Further, in some embodiments, some of the actions, acts, blocks, steps, or the like may be omitted, added, modified, skipped, or the like without departing from the scope of the present disclosure.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for handling a dual registration in a wireless communication system, the method comprising:
   registering a User Equipment (UE) on a first Radio Access Technology (RAT) and a second RAT;
   determining, by the UE, an occurrence of at least one service degradation event associated with service on the first RAT;
   suspending, by the UE, the registration on the second RAT based at least in part on the occurrence of the at least one service degradation event associated with the service on the first RAT; and
   performing, by the UE, communication using the registration on the first RAT.

2. The method of claim 1, wherein registering the UE on the first RAT and the second RAT comprises:
   registering the UE on the second RAT;
   detecting that an IP Multimedia Subsystem (IMS) service is unavailable on the second RAT; and
   registering, by the UE, on the first RAT.

3. The method of claim 1, wherein registering the UE on the first RAT and the second RAT comprises:
registering the UE on the first RAT;
detecting that an IP Multimedia Subsystem (IMS) service is unavailable on the first RAT; and
registering, by the UE, on the second RAT.

4. The method of claim 1, wherein the at least one service degradation event comprises an unavailability of a Circuit Switched Fallback (CSFB) on the first RAT, a service loss or failure at the first RAT, and a mobility of the UE to from the first RAT to a legacy network, wherein the legacy network comprises a second generation (2G) network or a third generation (3G) network.

5. The method of claim 1, wherein the first RAT is a 4G RAT and the second RAT is a 5G RAT.

6. The method of claim 1, wherein the dual registration is provided when N26 interface is supported between a Mobility Management Entity (MME) and an Access and Mobility Management Function (AMF) entity.

7. The method of claim 1, further comprising:
shifting one or more public data networks (PDNs) from the second RAT to the first RAT based on detecting that an IP Multimedia Subsystem (IMS) service is unavailable on the second RAT.

8. The method of claim 7, wherein detecting that the IP Multimedia Subsystem (IMS) service is unavailable on the second RAT comprises at least one of determining a roaming area not allowed condition for the second RAT, determining no suitable cells are available in a tracking area (TA) of the second RAT, or determining an abnormal condition for the second RAT.

9. The method of claim 1, further comprising:
determining, by the UE, whether a common Public Land Mobile Network (PLMN) is available in a Registered Public Land Mobile Network (RPLMN) and equivalent PLMN list currently available with the first RAT and an RPLMN and equivalent PLMN list previously received from a second RAT, or
determining, by the UE, whether an Equivalent Home PLMN (EHPLMN) is available in each of the RPLMN and equivalent PLMN list currently available with the first RAT and the RPLMN and equivalent PLMN list previously received from the second RAT, wherein the UE is registered on the second RAT based at least in part on whether either of the common PLMN or the EHPLMN is available.

10. A user equipment (UE) for handling a dual registration in a wireless communication system, the UE comprising:
a memory; and
a processor, coupled with the memory, configured to:
register on a first Radio Access Technology (RAT) and a second RAT;
determine an occurrence of at least one service degradation event associated with service on the first RAT;
suspend the registration on the second RAT based at least in part on the occurrence of the at least one service degradation event associated with the service on the first RAT; and
perform communication using the registration on the first RAT.

11. The UE of claim 10, wherein registering the UE on the first RAT and the second RAT further comprises:
registering the UE on the second RAT;
detecting that an IP Multimedia Subsystem (IMS) service is unavailable on the second RAT; and
registering on the second RAT.

12. The UE of claim 10, wherein registering the UE on the first RAT and the second RAT further comprises:
registering the UE on the first RAT;
detecting that an IP Multimedia Subsystem (IMS) service is unavailable on the first RAT; and
registering on the second RAT.

13. The UE of claim 10, wherein the at least one service degradation event comprises an unavailability of a Circuit Switched Fallback (CSFB) on the first RAT, a service loss or failure at the first RAT, and a mobility of the UE to a legacy network, wherein the legacy network comprises a second generation (2G) network or a third generation (3G) network.

14. The UE of claim 10, wherein the first RAT is a 4G RAT and the second RAT is a 5G RAT.

15. The UE of claim 10, wherein the dual registration is provided when N26 interface is supported between a Mobility Management Entity (MME) and an Access and Mobility Management Function (AMF) entity.

* * * * *